United States Patent
Nishikawa et al.

(10) Patent No.: US 10,397,750 B2
(45) Date of Patent: Aug. 27, 2019

(54) METHOD, CONTROLLER, TELEPRESENCE ROBOT, AND STORAGE MEDIUM FOR CONTROLLING COMMUNICATIONS BETWEEN FIRST COMMUNICATION DEVICE AND SECOND COMMUNICATION DEVICES

(71) Applicant: Panasonic Intellectual Property Management Co., Ltd., Osaka (JP)

(72) Inventors: Yuri Nishikawa, Kanagawa (JP); Shun Matsuura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/865,989

(22) Filed: Jan. 9, 2018

(65) Prior Publication Data
US 2018/0213362 A1    Jul. 26, 2018

(30) Foreign Application Priority Data

Jan. 20, 2017   (JP) .................................. 2017-008547
Sep. 11, 2017   (JP) .................................. 2017-173789

(51) Int. Cl.
*H04W 4/029*        (2018.01)
*G05D 1/02*         (2006.01)
(Continued)

(52) U.S. Cl.
CPC .......... *H04W 4/029* (2018.02); *G05D 1/0274* (2013.01); *G05D 1/0291* (2013.01);
(Continued)

(58) Field of Classification Search
CPC .... H04W 4/029; H04W 4/026; G05D 1/0274; G06K 9/00281; H04N 7/141
See application file for complete search history.

(56) References Cited

U.S. PATENT DOCUMENTS 6,535,793 B2 * 3/2003 Allard .................... B25J 9/1689
                                                318/628
9,789,612 B2 * 10/2017 Hoffman .................. B25J 9/161
(Continued)

FOREIGN PATENT DOCUMENTS

JP         2004-230479           8/2004

*Primary Examiner* — Julio R Perez
(74) *Attorney, Agent, or Firm* — Greenblum & Bernstein, P.L.C.

(57) ABSTRACT

A communication controlling method includes: (A) receiving, from second communication devices, device identification information items for identifying the second communication devices, and situation information items for grasping situations around the second communication devices; (B) when at least one of the received situation information items includes an information item on a user, updating a neighborhood information database indicating which second communication device is around which user, based on the information item on the user and the at least one of the device identification information items; (C) when receiving a request for connection to a target user from the first communication device, selecting, from among the second communication devices, a second communication device present around the target user with reference to the neighborhood information database; and (D) communicably connecting the selected second communication device and the first communication device.

20 Claims, 16 Drawing Sheets

(51) Int. Cl.
*G06K 9/00* (2006.01)
*H04W 4/02* (2018.01)
*H04N 7/14* (2006.01)
*H04N 7/15* (2006.01)
*B25J 5/00* (2006.01)

(52) U.S. Cl.
CPC ......... *G06K 9/00281* (2013.01); *H04N 7/141* (2013.01); *H04N 7/142* (2013.01); *H04N 7/15* (2013.01); *H04W 4/026* (2013.01); *B25J 5/007* (2013.01); *G05D 2201/0207* (2013.01); *G05D 2201/0211* (2013.01); *G06K 9/00697* (2013.01); *H04W 4/023* (2013.01)

(56) References Cited

U.S. PATENT DOCUMENTS

| | | | | |
|---|---|---|---|---|
| 2012/0197464 | A1* | 8/2012 | Wang | B25J 9/1689 |
| | | | | 701/2 |
| 2018/0213362 | A1* | 7/2018 | Nishikawa | H04N 7/142 |
| 2018/0373239 | A1* | 12/2018 | Tsubota | G05D 1/0022 |

* cited by examiner

FIG. 6

| USER IDENTIFICATION INFORMATION | IDENTIFICATION INFORMATION ON NEAREST ROBOT | FACE AREA | LAST DETECTION TIME | SYNCHRONIZATION FLAG |
|---|---|---|---|---|
| X | A | 50 | 16:05 | |
| Y | B | 30 | 16:08 | |
| Z | C | 40 | 16:03 | |

FIG. 7

| USER IDENTIFICATION INFORMATION | IDENTIFICATION INFORMATION ON NEAREST ROBOT | FACE AREA | LAST DETECTION TIME | SYNCHRONIZATION FLAG |
|---|---|---|---|---|
| X | A | 50 | 16:05 | |
| Y | B | 30 | 16:08 | |
| Z | A | 70 | 16:10 | 1 |

FIG. 10

| TIME | IDENTIFICATION INFORMATION ON COMMUNICATION SOURCE USER | IDENTIFICATION INFORMATION ON COMMUNICATION DESTINATION USER |
|---|---|---|
| 10:20 | a | X |
| 10:50 | b | X |
| 13:45 | c | Y |
| 15:00 | d | X |
| ⋮ | ⋮ | ⋮ |

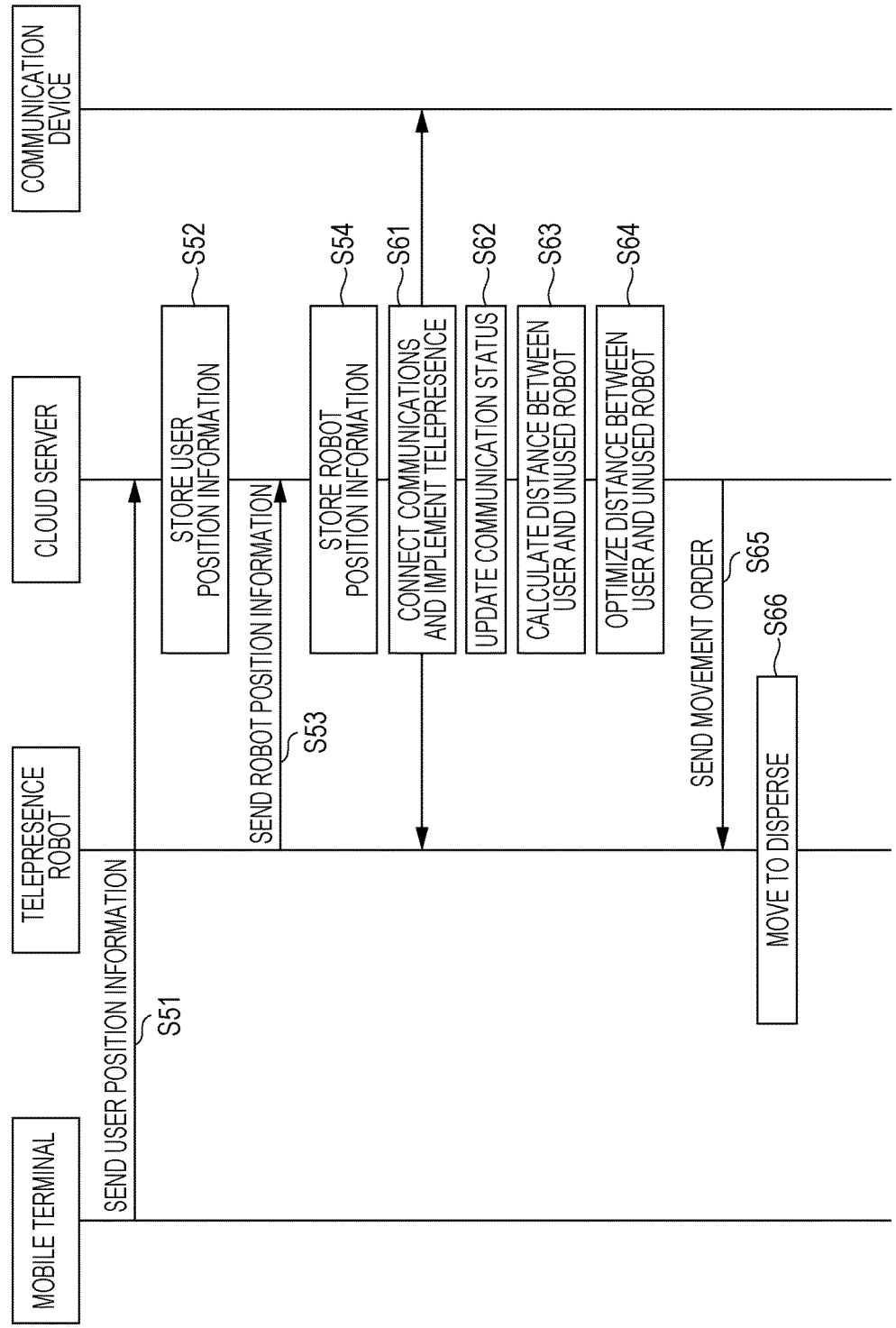

METHOD, CONTROLLER, TELEPRESENCE ROBOT, AND STORAGE MEDIUM FOR CONTROLLING COMMUNICATIONS BETWEEN FIRST COMMUNICATION DEVICE AND SECOND COMMUNICATION DEVICES

BACKGROUND

1. Technical Field

The present disclosure relates to a communication control method, a controller, a telepresence robot, and a storage medium.

2. Description of the Related Art

In recent years, development of artificial intelligence has encouraged the use of robots for communications, such as conversations, between a communication source user and a communication destination user. Japanese Unexamined Patent Application Publication No. 2004-230479, for example, discloses a communication system in which: a user A inputs voices and relevant body actions into a robot; the robot creates a message including the voices and the body actions; when the message is one addressed to a user C in a remote location, the robot sends the message to another robot in the remote location; and the robot in the remote location reproduces the voices and body actions which are included in the recorded message. This publication says that, since the system reproduces not only the voices but also the body actions, the system enables natural communications to be achieved via the robots.

SUMMARY

In one general aspect, the techniques disclosed here feature a method of controlling communications between a first communication device and second communication devices, the method including: (A) receiving, from the second communication devices, device identification information items for identifying the second communication devices, and situation information items for grasping situations around the second communication devices; (B) when at least one of the received situation information items includes an information item on a user, updating a neighborhood information database indicating which second communication device is around which user, based on the information item on the user and the at least one of the device identification information items; (C) when receiving a request for connection to a target user from the first communication device, selecting, from among the second communication devices, a second communication device present around the target user with reference to the neighborhood information database; and (D) communicably connecting the selected second communication device and the first communication device.

It should be noted that comprehensive or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 is a diagram illustrating an example of a neighborhood information item on which telepresence robots illustrated in FIG. 1 perform neighborhood information management;

FIG. 7 is a diagram illustrating an example of a neighborhood information item obtained by the neighborhood information management to be performed by the telepresence robots illustrated in FIG. 1;

FIG. 10 is a diagram illustrating an example of a communication history information item to be stored in a communication history database illustrated in FIG. 9;

FIG. 17 is a sequence diagram illustrating an example of how the communication system illustrated in FIG. 15 performs a communication control process.

Figure 1:
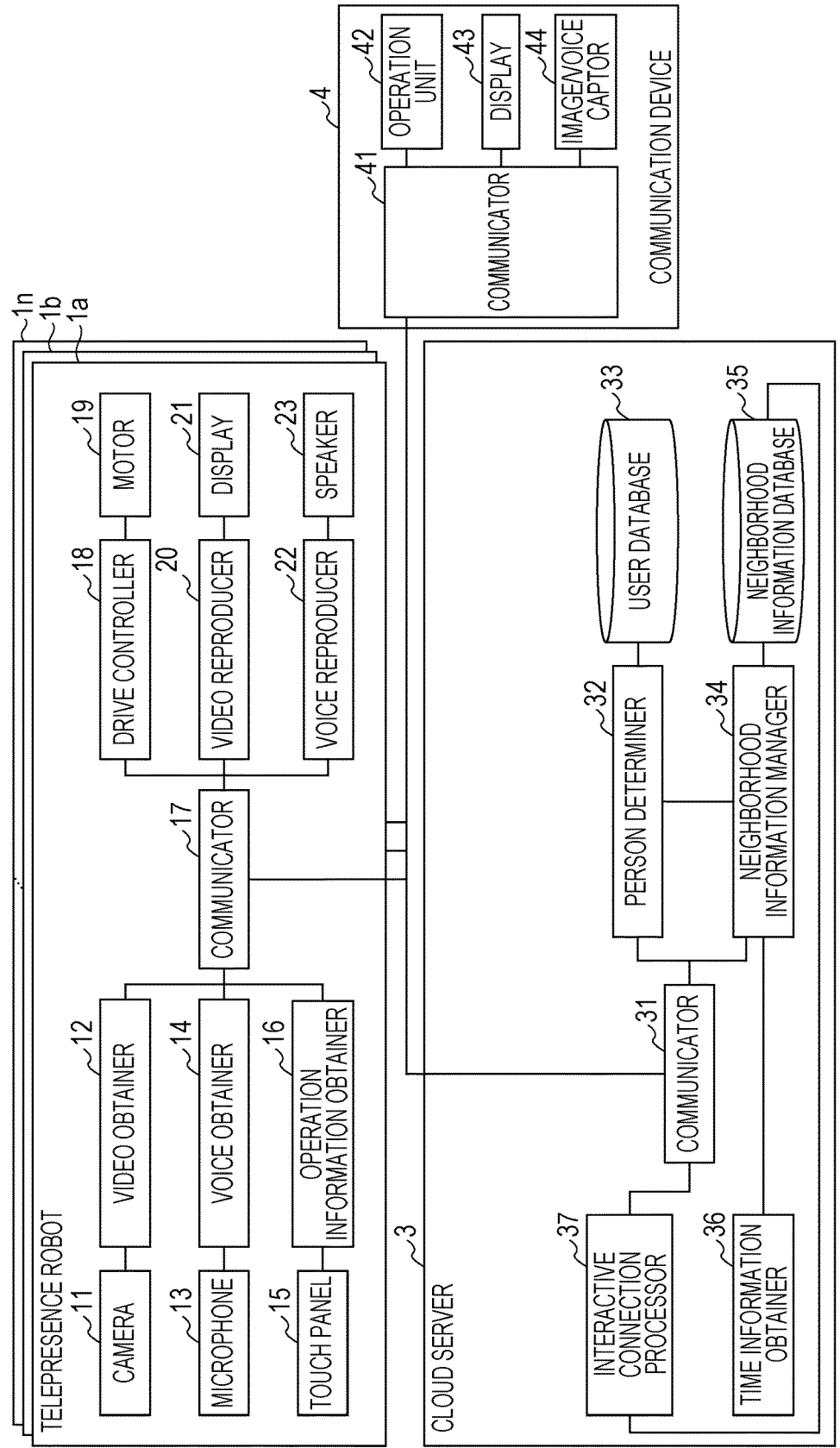
FIG. 1 is a block diagram illustrating an example of a configuration of a communication system according to Embodiment 1 of the present disclosure.

DETAILED DESCRIPTION (Underlying Knowledge Forming Basis of the Present Disclosure)

Recent years, there are rapid advancements in capabilities of robots to communicate with persons, and developments of telepresence robots each being an autonomous mobile robot combined with telecommunication technologies, remote controlling technologies and other technologies are underway. As an avatar of a communication source user, a telepresence robot does various things in a remote location such as walking from one place to another and having conversations with a communication destination user. Giving an unprecedented presence to the communication destination user, the telepresence robot helps the communication source user to have enhanced communications with the communication destination user. Because of these capabilities, telepresence robots have started to be used at homes of teleworkers, event venues, offices, places of education, and the like.

Japanese Unexamined Patent Application Publication No. 2004-230479 discloses the communication system designed on the premise that multiple communication robots are stationed in a remote location, and configured to fixedly manage address information in a way that, when a communication source user wishes to access a specific person, a robot to be connected is automatically identified. For this reason, the communication source user need not care where the communication destination user is.

Since the address information is fixedly managed, however, this communication system causes a case where the communication robot identified using the address information is not appropriate for the communication destination user. In other words, in the actual situation, users and robots move around, and a case occurs where a robot fixedly assigned to a communication destination user is far away from the communication destination user. This means that the fixedly assigned robot is not always an optimum robot for an access to the communication destination user.

Assuming an office environment where there are many telepresence robots and many persons (users), consider a case where a person in a remote location wishes to access a person in this environment. In this case, since many robots and many users move around, it is important to select a robot to be connected among many robots that is most accessible for the communication destination user.

In this respect, the address information needs to be continuously and dynamically updated to appropriately select a telepresence robot to be connected when a communication source person wishes to access a communication destination person.

A possible example is a construction of an interactive system (communication system) including multiple telepresence robots (communication destination devices), a communication source device, and a communication controller for performing neighborhood information management and interactive connection, where the communication controller grasps neighborhood information on which telepresence robot is the nearest to a communication destination person. In this process, the communication controller registers, into a database of the neighborhood information, the last telepresence robot which recognizes the communication destination person using a video device among the telepresence robots, as a telepresence robot which provides the easiest access to the person.

A telepresence robot which is the nearest to the communication destination person can be determined as a communication destination device by: continuously updating the neighborhood information such that the last telepresence robot which recognizes the communication destination person is registered as a telepresence robot which provides the easiest access to the person as discussed above; and determining the telepresence robot to be used as the communication destination device using the neighborhood information.

Based on the above-discussed underlying knowledge, the inventors of the application have earnestly examined how to determine a communication destination device to be used by a communication destination user from multiple communication destination devices in an environment where multiple communication users and others move, and have completed the present disclosure.

A communication control method according to an aspect of the present disclosure is a communication method for a communication system which includes: a communication source device used by a communication source user; communication destination devices which a communication destination user can use to communicate with the communication source user; and a communication controller which controls communications between the communication source device and the communication destination devices. Each of the communication destination devices sends the communication controller a user determination data item for determining which user is around the communication destination device, and a communication device identification information item for identifying the communication destination device. The communication controller includes a neighborhood information storage. The communication controller receives the user determination data item and the communication device identification information item from each of the communication destination devices; based on the user determination data item, determines which user is around the communication destination device; generates a user identification information item for identifying the determined user; based on the user determination data item and the communication device identification information item, creates a neighborhood information item in which the user identification information item and the communication device identification information item for identifying a communication destination device which is the nearest to the user identified based on the user identification information item are associated with each other; and stores the neighborhood information item in the neighborhood information storage. The communication source device sends the communication controller a communication request command which includes the user identification information item on the communication destination user. Upon receipt of the communication request command, the communication controller refers to the neighborhood information item in the neighborhood information storage, and communicably connects the communication source device to the communication destination device identified based on the communication device identification information item which is associated with the user identification information item on the communication destination user.

Because of the above configuration, each of the communication destination devices sends the communication controller the user determination data item for determining which user is around the communication destination device, and the communication device identification information item for identifying the communication destination device. The communication controller receives the user determination data item and the communication device identification information item from each of the communication destination devices; based on the user determination data item, determines which user is around the communication destination device; generates the user identification information item for identifying the determined user; based on the user determination data item and the communication device identification information item, creates the neighborhood information item in which the user identification information item and the communication device identification information item for identifying the communication destination device which is the nearest to the user identified based on the user identification information item are associated with each other; and stores the neighborhood information item in the neighborhood information storage. Thus, the neighborhood information item in which the user identification information item and the communication device identification information item for identifying the communication destination device which is the nearest to the user identified based on the user identification information item are associated with each other is updated each time the user determination data item and the communication device identification information item are sent from each of the communication destination devices. Accordingly, for each user, the neighborhood information item for identifying the communication destination device which is the nearest to the user can be created.

In this respect, once the communication source device sends the communication controller the communication request command which includes the user identification information item on the communication destination user, the communication controller receives the communication request command; refers to the neighborhood information item in the neighborhood information storage; and communicably connects the communication source device to the communication destination device identified based on the communication device identification information item which is associated with the user identification information item on the communication destination user. For this reason, the communication source device used by the communication source user can be communicably connected to the communication destination device which is the nearest to the communication destination user. Accordingly, in an environment where communication destination users move, the communication source device used by the communication source user can be communicably connected to the communication destination device which is the most appropriate for the communication destination user among the communication destination devices.

The communication control method may be configured as follows. Each of the communication destination devices sends the communication controller an image data item obtained by capturing an image of a user present around the communication destination device, and the communication device identification information item for identifying the communication destination device. The communication controller further includes a reference data storage which, for each of the communication destination users, associates and stores a reference face image data item on the face of the user and the user identification information item for identifying the user. The communication controller receives the image data item and the communication device identification information item from each of the communication destination devices, extracts a face image data item on the face of the user from the image data item, and compares the face image data item with the reference face image data items stored in the reference data storage. Thereby, the communication controller determines a user included in the image data item, and reads from the reference data storage the user identification information item associated with the reference face image data item on the determined user, and stores in the neighborhood information storage the neighborhood information item in which the user identification information item corresponding to the image data item acquired at the latest acquisition time and the communication device identification information item sent together with the image data item are associated with each other.

Because of the above configuration, each of the communication destination devices sends the communication controller the image data item obtained by capturing the image of the user present around the communication destination device, and the communication device identification information item for identifying the communication destination device. The communication controller receives the image data item and the communication device identification information item from each of the communication destination devices, extracts the face image data item on the face of the user from the image data item, and compares the face image data item with the reference face image data items stored in the reference data storage. Thereby, the communication controller determines the user included in the image data item, and reads from the reference data storage the user identification information item associated with the reference face image data item on the determined user, and stores in the neighborhood information storage the neighborhood information item in which the user identification information item corresponding to the image data item acquired at the latest acquisition time and the communication device identification information item sent together with the image data item are associated with each other. For this reason, when the user can be determined using the face image data item extracted from the image data item, the neighborhood information item can be updated to the user identification information item and the communication device identification information item both corresponding to the image data item acquired at the latest acquisition time. Accordingly, for each user, the neighborhood information item for identifying the communication destination device which is the nearest to the user can be created.

The communication control method may be configured as follows. When the communication controller determines the same user from image data items which are sent from the communication destination devices within a predetermined period, the communication controller extracts face image areas representing the face of the user from the respective image data items, and compares an face image data item from which a face image area with the largest area is extracted with the reference face image data items. Thereby, the communication controller determines the user from the face image data item from which the face image area with the largest area is extracted, reads from the reference data storage the user identification information item associated with the reference face image data item on the determined user, and stores in the neighborhood information storage the neighborhood information item in which the user identification information item read from the reference data storage in connection with the face image data item from which the face image area with the largest area is extracted, and the communication device identification information item for identifying the communication destination device having sent the face image data item from which the face image area with the largest area is extracted are associated with each other.

Because of the above configuration, when the same user is determined from the image data items which are sent from the communication destination devices within the predetermined period, the face image areas representing the face of the user are extracted from the respective image data items; the face image data item from which the face image area with the largest area is extracted is compared with the reference face image data items; thereby, the user is determined from the face image data item from which the face image area with the largest area is extracted; the user identification information item associated with the reference face image data item on the determined user is read from the reference data storage; and the neighborhood information storage stores the neighborhood information item in which the user identification information item read from the reference data storage in connection with the face image data item from which the face image area with the largest area is extracted, and the communication device identification information item for identifying the communication destination device having sent the face image data item from which the face image area with the largest area is extracted are associated with each other. For this reason, even when the communication destination devices detect the same user, it is possible to create the neighborhood information item for identifying the communication destination device having sent the face image data item from which the face image area with the largest area is extracted, that is to say, the single communication destination device which is the nearest to the user.

The communication control method may be configured as follows. When the communication controller determines multiple users from the image data items, the communication controller extracts face image data items on the faces of the users, and compares the face image data items with the reference face image data items. Thereby, the communication controller determines the multiple users included in the image data items, and reads from the reference data storage user identification information items associated with the reference face image data items on the multiple determined users. Hence, for each of the multiple users, the communication controller stores in the neighborhood information storage the neighborhood information item in which the user identification information item corresponding to the image data item acquired at the latest acquisition time and the communication device identification information item sent together with the image data item are associated with each other.

Because of the above configuration, when the communication controller determines the multiple users from the image data items, the communication controller extracts the face image data items on the faces of the users, and compares the face image data items with the reference face image data items. Thereby, the communication controller determines the multiple users included in the image data items, and reads from the reference data storage the user identification information items associated with the reference face image data items on the multiple determined users. Hence, for each of the multiple users, the communication controller stores in the neighborhood information storage the neighborhood information item in which the user identification information item corresponding to the image data item acquired at the latest acquisition time and the communication device identification information item sent together with the image data item are associated with each other.

The communication control method may be configured as follows. Each of the communication destination devices sends the communication controller a voice data item obtained by collecting voice of a user present around the communication destination device, and the communication device identification information item for identifying the communication destination device. The communication controller further includes a reference data storage which, for each of the users, associates and stores a reference voice data item on the voice of the user and the user identification information items for identifying the user. The communication controller receives the voice data item and the communication device identification information item from each of the communication destination devices, and compares the voice data item with reference voice data items stored in the reference data storage. Thereby, the communication controller determines the user who utters the voice, and reads from the reference data storage the user identification information item associated with the reference voice data item on the determined user, and stores in the neighborhood information storage the neighborhood information item in which the user identification information item corresponding to the voice data item acquired at the latest acquisition time and the communication device identification information item sent together with the voice data item are associated with each other.

Because of the above configuration, each of the communication destination devices sends the communication controller the voice data item obtained by collecting the voice of the user present around the communication destination device, and the communication device identification information item for identifying the communication destination device. The communication controller receives the voice data item and the communication device identification information item from each of the communication destination devices, and compares the voice data item with the reference voice data items stored in the reference data storage. Thereby, the communication controller determines the user who utters the voice, and reads from the reference data storage the user identification information item associated with the reference voice data item on the determined user, and stores in the neighborhood information storage the neighborhood information item in which the user identification information item corresponding to the voice data item acquired at the latest acquisition time and the communication device identification information item sent together with the voice data item are associated with each other. For this reason, when the user can be determined using the voice data item, the neighborhood information item can be updated to the user identification information item and the communication device identification information item both corresponding to the voice data item acquired at the latest acquisition time. Accordingly, for each user, the neighborhood information item for identifying the communication destination device which is the nearest to the user can be created.

The communication control method may be configured as follows. When the communication controller determines the same user from the voice data items which are sent from the communication destination devices within a predetermined period, the communication controller detects the voice source locations of the voice data items relative to the communication destination devices using the voice data items, and compares a voice data item, the distance of whose voice source location from the corresponding communication destination device is shorter than the distance of the voice source location of any other voice data item from the corresponding communication destination device, with the reference voice data items. Thereby, the communication controller determines the user related to the voice data item, the distance of whose voice source location from the corresponding communication destination device is shorter than the distance of the voice source location of any other voice data item from the corresponding communication destination device. The communication controller reads from the reference data storage the user identification information item associated with the reference voice data item on the determined user, and stores in the neighborhood information storage the neighborhood information item in which the user identification information item read from the reference data storage in connection with the voice data item, the distance of whose voice source location from the corresponding communication destination device is shorter than the distance of the voice source location of any other voice data item from the corresponding communication destination device, and the communication device identification information item for identifying the communication destination device having sent the voice data item, the distance of whose voice source location from the corresponding communication destination device is shorter than the distance of the voice source location of any other voice data item from the corresponding communication destination device, are associated with each other.

Because of the above configuration, when the same user is determined from the voice data items which are sent from the communication destination devices within the predetermined period, the voice source locations of the voice data items relative to the communication destination devices are detected using the voice data items; the voice data item, the distance of whose voice source location from the corresponding communication destination device is shorter than the distance of the voice source location of any other voice data item from the corresponding communication destination device, is compared with the reference voice data items; thereby, the user related to the voice data item, the distance of whose voice source location from the corresponding communication destination device is shorter than the distance of the voice source location of any other voice data item from the corresponding communication destination device, is determined; the user identification information item associated with the reference voice data item on the determined user is read from the reference data storage; and the neighborhood information storage stores the neighborhood information item in which the user identification information item read from the reference data storage in connection with the voice data item, the distance of whose voice source location from the corresponding communication destination device is shorter than the distance of the voice source location of any other voice data item from the corresponding communication destination device, and the communication device identification information item for identifying the communication destination device having sent the voice data item, the distance of whose voice source location from the corresponding communication destination device is shorter than the distance of the voice source location of any other voice data item from the corresponding communication destination device, are associated with each other. For this reason, even when the communication destination devices detect the same user, it is possible to create the neighborhood information item for identifying the communication destination device having sent the voice, the distance of whose voice source location from the corresponding communication destination device is shorter than the distance of the voice source location of any other voice data item from the corresponding communication destination device, that is to say, the single communication destination device which is the nearest to the user.

The communication control method may be configured as follows. Each of the communication destination devices receives a beacon signal, inclusive of a user identification information item for identifying a user present around the communication destination device, from a transmitter owned by the user, as well as sends the communication controller an intensity information item on radio wave intensity of the received beacon signal, the user identification information item, and a communication device identification information item for identifying the communication destination device. The communication controller receives the intensity information item, the user identification information item and the communication device identification information item from each of the communication destination devices, and stores in the neighborhood information storage the neighborhood information item in which the user identification information item sent together with the intensity information item corresponding the beacon signal with the largest radio wave intensity, and the communication device identification information item are associated with each other.

Because of the above configuration, each of the communication destination devices receives the beacon signal, inclusive of the user identification information item for identifying the user present around the communication destination device, from the transmitter owned by the user, as well as sends the communication controller the intensity information item on the radio wave intensity of the received beacon signal, the received user identification information item, and the communication device identification information item for identifying the communication destination device. The communication controller receives the intensity information item, the user identification information item and the communication device identification information item from each of the communication destination devices, as well as stores in the neighborhood information storage the neighborhood information item in which the user identification information item sent together with the intensity information item corresponding the beacon signal with the largest radio wave intensity, and the communication device identification information item are associated with each other. For each user, it is possible to create the neighborhood information item for identifying the communication destination device which sends the intensity information item corresponding the beacon signal with the largest radio wave intensity, that is to say, the communication destination device which is the nearest to the user.

The communication control method may be configured as follows. Each of the communication destination devices is movably configured. The communication controller further includes a communication history storage. The communication controller stores in the communication history storage a communication history information item on communication history between the communication source device and each of the communication destination devices, in which the user identification information item for identifying the communication destination user who communicates using the communication destination device, and time information items on times when the communication destination user uses the communication destination device are associated with each other. The communication controller refers to the communication history information item in the communication history storage, and thereby identifies a communication destination user with a communication frequency higher than a predetermined value. The communication controller deploys at least one of the communication destination devices around the identified communication destination user.

Because of the above configuration, the communication history storage stores the communication history information item on the communication history between the communication source device and each of the communication destination devices, in which the user identification information item for identifying the communication destination user who communicates using the communication destination device, and the time information items on the times when the communication destination user uses the communication destination device are associated with each other.

The communication destination user with the communication frequency higher than the predetermined value is identified by referring to the communication history information item in the communication history storage, and the at least one of the communication destination devices is deployed around the identified communication destination user. For this reason, the frequently-accessed communication destination user can easily communicate with the communication source device using the nearby-existing communication destination device.

The communication control method may be configured as follows. The communication controller refers to the communication history information item in the communication history storage, and thereby identifies a time range when the communication frequency of the communication destination user is higher than a predetermined value. The communication controller deploys at least one of the communication destination devices around the communication destination user for the time range.

Because of the above configuration, the time range when the communication frequency of the communication destination user is higher than the predetermined value is identified by referring to the communication history information item in the communication history storage, and the at least one of the communication destination devices is deployed around the communication destination user for the time range. For this reason, the frequently-accessed communication destination user can easily communicate with the communication source device using the nearby-existing communication destination device for the frequently-accessed time range.

The communication control method may be configured as follows. The communication destination user includes multiple communication destination users. Each of the communication destination devices is movably configured. The communication controller obtains user position information items on the positions of the communication destination users and device position information items on the positions of the communication destination devices. Based on the user position information items and the device position information items, the communication controller moves the communication destination devices such that the communication destination devices are deployed dispersedly around the communication destination users.

Because of the above configuration, the user position information items on the positions of the communication destination users and the device position information items on the positions of the communication destination devices are obtained. Based on the received user position information items and device position information items, the communication destination devices are moved such that the communication destination devices are deployed dispersedly around the communication destination users. For this reason, each of the communication destination users can easily communicate with the communication source device using a communication destination device which is the nearest to the communication destination user. Accordingly, the communication destination devices can be used efficiently.

The communication control method may be configured as follows. The communication controller moves out-of-communication devices not engaging in communication with the communication source device, which are among the communication destination devices, such that the out-of-communication devices are deployed dispersedly around out-of-communication users not engaging in communication with the communication source device, who are among the communication destination users.

Because of the above configuration, the out-of-communication devices not engaging in communication with the communication source device, which are among the communication destination devices, are moved such that the out-of-communication devices are deployed dispersedly around the out-of-communication users not engaging in communication with the communication source device, who are among the communication destination users. For this reason, each of the out-of-communication users can easily communicate with the communication source device using a communication destination device which is the nearest to the out-of-communication user. Accordingly, the out-of-communication devices can be used efficiently.

The communication control method may be configured as follows. Each of the communication destination devices is formed from a telepresence robot which conveys a message of the communication source user to the communication destination user. The telepresence robot includes: a communicator for sending the user determination data item and the communication device identification information item to the communication controller; an autonomous movement unit for the telepresence robot to autonomously move; and a presentation unit for presenting the message of the communication source user to the communication destination user.

Because of the above configuration, in an environment where not only the users but also the telepresence robots move, the communication source device used by the communication source user is communicably connected to a telepresence robot which is the nearest to the communication destination user among the telepresence robots.

Besides, a communication control method according to another aspect of the present disclosure is a communication control method for a communication system which includes: a communication source device used by a communication source user; communication destination devices which a communication destination user can use to communicate with the communication source user; and a communication controller which controls communications between the communication source device and the communication destination devices. Each of the communication destination devices is movably configured. The communication controller includes a communication history storage. The communication controller stores in the communication history storage a communication history information item between the communication source device and each of the communication destination devices, in which a user identification information item for identifying the communication destination user who communicates using the communication destination device, and time information items on times when the communication destination user uses the communication destination device are associated with each other. The communication controller refers to the communication history information item in the communication history storage, thereby identifies the communication destination user with a communication frequency higher than a predetermined value, and deploys at least one of the communication destination devices around the identified communication destination user.

Because of the above configuration, the communication history storage stores the communication history information item between the communication source device and each of the communication destination devices, in which the user identification information item for identifying the communication destination user who communicates using the communication destination device, and the time information items on the times when the communication destination user uses the communication destination device are associated with each other. The communication destination user with the communication frequency higher than the predetermined value is identified by referring to the communication history information item in the communication history storage. Thereby, the at least one of the communication destination devices is deployed around the identified communication destination user. For this reason, the frequently-accessed communication destination user can easily communicate with the communication source device using the nearby-existing communication destination device.

Moreover, a communication control method according to another aspect of the present disclosure is a communication control method for a communication system which includes: a communication source device used by a communication source user; communication destination devices which a communication destination user can use to communicate with the communication source user; and a communication controller which controls communications between the communication source device and the communication destination devices. The communication destination user includes multiple communication destination users. Each of the communication destination devices is movably configured. The communication controller obtains user position information items on the positions of the communication destination users and device position information items on the position of the communication destination devices. Based on the user position information items and the device position information items, the communication controller moves the communication destination devices such that communication destination devices are deployed dispersedly around the communication destination users.

Because of the above configuration, the user position information items on the positions of the communication destination users and the device position information items on the positions of the communication destination devices are obtained. Based on the obtained user position information items and device position information items, the communication destination devices are moved such that communication destination devices are deployed dispersedly around the communication destination users. For this reason, each of the communication destination users can easily communicate with the communication source device using a communication destination device which is the nearest to the destination user. Accordingly, the communication destination devices can be used efficiently.

In addition, the present disclosure not only can be embodied as the communication control method of performing the above-featured process, but also can be embodied as things such as the communication controller which includes the featured configuration corresponding to the featured process included in the communication control method. The telepresence robots may include parts or all of the components of the communication controller of the present disclosure. Furthermore, the present disclosure also can be embodied as a computer program which causes a computer to execute the featured process included in the communication control method of the present disclosure. For this reason, the below-discussed other aspects of the present disclosure can bring about the same effects as the above-discussed communication control methods.

A communication controller according to another aspect of the present disclosure is a communication controller which controls communications between a communication source device used by a communication source user and communication destination devices which a communication destination user can use to communicate with the communication source user. The communication controller includes: a communicator which, from each of the communication destination devices, receives a user determination data item for determining a user present around the communication destination device and a communication device identification information item for identifying the communication destination device; a determiner which determines the user present around the communication destination device based on the user determination data item, and generates a user identification information item for identifying the determined user; a manager which, based on the user determination data item and the communication device identification information item, creates a neighborhood information item in which the user identification information item, and a communication device identification information item for identifying a communication destination device which is the nearest to the user identified based the user identification information item are associated with each other; a neighborhood information storage which stores the neighborhood information item; and a connector which, upon receipt of a connection request command, inclusive of the user identification information item on the communication destination user, using the communicator from the communication source device, refers to the neighborhood information item in the neighborhood information storage, and communicably connects the communication source device to the communication destination device identified based on the communication device identification information item associated with the user identification information item on the communication destination user.

A communication controller according to another aspect of the present disclosure is a communication controller which controls communications between a communication source device used by a communication source user and movably-configured communication destination devices which a communication destination user can use to communicate with the communication source user. The communication controller includes: a communication history storage which stores a communication history information item between the communication source device and each of the communication destination devices, in which a user identification information item for identifying the communication destination user who communicates using the communication destination device, and time information items on times when the communication destination user uses the communication destination device are associated with each other; a communication history analyzer which refers to the communication history information item in the communication history storage, and thereby identifies the communication destination user with a communication frequency higher than a predetermined value; and a position controller which deploys at least one of the communication destination devices around the identified communication destination user.

Furthermore, a communication controller according to another aspect of the present disclosure is a communication controller which controls communications between a communication source device used by a communication source user and movably-configured communication destination devices which communication destination users can use to communicate with the communication source user. The communication controller includes: an obtainer which obtains user position information items on the positions of the communication destination users, and device position information items on the positions of the communication destination devices; and a position manager which, based on the user position information items and the device position information items, moves the communication destination devices such that the communication destination devices are deployed dispersedly around the communication destination users.

A telepresence robot according to another aspect of the present disclosure is a telepresence robot which conveys a message of a communication source user to a communication destination user. The telepresence robot includes the above-discussed communication controller, an autonomous movement unit for the telepresence robot to autonomously move, and a presentation unit which presents the message of the communication source user to the communication destination user.

The telepresence robot may be configured such that when the neighborhood information item stored in the neighborhood information storage is updated, the communicator sends the updated neighborhood information item to other telepresence robots.

Because of the above configuration, when the neighborhood information item stored in the neighborhood information storage is updated, the updated neighborhood information item is sent to the other telepresence robots. For this reason, the telepresence robots are capable of managing the same neighborhood information item.

A communication control program according to another aspect of the present disclosure is a communication control program for causing a computer to function as a communication controller which controls communications between a communication source device used by a communication source user and communication destination devices which a communication destination user can use to communicate with the communication source user. The communication control program causes the computer to perform: a process of, from each of the communication destination devices, receiving a user determination data item for determining a user present around the communication destination device and a communication device identification information item for identifying the communication destination device; a process of determining the user present around the communication destination device based on the user determination data item; a process of generating a user identification information item for identifying the determined user; a process of, based on the user determination data item and the communication device identification information item, creating a neighborhood information item in which the user identification information item, and a communication device identification information item for identifying a communication destination device which is the nearest to the user identified based the user identification information item are associated with each other; a process of storing the neighborhood information item in a neighborhood information storage; and a process of, upon receipt of a connection request command, inclusive of the user identification information item on the communication destination user, from the communication source device, referring to the neighborhood information item in the neighborhood information storage, and communicably connecting the communication source device to the communication destination device identified based on the communication device identification information item associated with the user identification information item on the communication destination user.

Furthermore, a communication control program according to another aspect of the present disclosure is a communication control program for causing a computer to function as a communication controller which controls communications between a communication source device used by a communication source user and movably-configured communication destination devices which a communication destination user can use to communicate with the communication source user. The communication control program causes the computer to perform: a process of, in a communication history storage, storing a communication history information item between the communication source device and each of the communication destination devices, in which a user identification information items on the communication destination user who communicates using the communication destination device, and time information items on times when the communication destination user uses the communication destination device are associated with each other; a process of, by referring to the communication history information item in the communication history storage, identifying the communication destination user with a communication frequency higher than a predetermined value; and a process of deploying at least one of the communication destination devices around the identified communication destination user.

Furthermore, a communication control program according to another aspect of the present disclosure is a communication control program for causing a computer to function as a communication controller which controls communications between a communication source device used by a communication source user and movably-configured communication destination devices which communication destination users can use to communicate with the communication source user. The communication control program causes the computer to perform: a process of obtaining user position information items on the positions of the communication destination users, and device position information items on the positions of the communication destination devices; and a process of, based on the user position information items and the device position information items, moving the communication destination devices such that the communication destination devices are deployed dispersedly around the communication destination users.

Moreover, it is needless to say that such computer programs may be distributed using a computer-readable non-transitory recording medium such as a CD-ROM, or a communication network such as the Internet.

It should be noted that each of the below-discussed embodiments shows a specific example of the present disclosure. Numerical values, shapes, components, steps, sequences of steps, and the like shown in the following embodiments are examples, but do not intend to limit the present disclosure. Furthermore, of the components in the following embodiments, components which are not described in the independent claims providing the generic concepts will be discussed as optional components. Moreover, all the embodiments may combine various contents.

Referring to the drawings, descriptions will be hereinbelow provided for the embodiments of the present disclosure.

Embodiment 1

FIG. 1 is a block diagram illustrating an example of a configuration of a communication system according to Embodiment 1 of the present disclosure. The communication system illustrated in FIG. 1 includes telepresence robots 1a to 1n (hereinafter referred to as a telepresence robot 1 as well), a cloud server 3 and a communication device 4.

The telepresence robot 1 is an example of the communication destination devices which are stationed in an office or the like in a location remote from a communication source user, and which a communication destination user can use to communicate with the communication source user. Furthermore, the telepresence robot 1 is an autonomous mobile robot into which teleconferencing technologies, remote controlling technologies and the like are incorporated. As an avatar of the communication source user, the telepresence robot 1 conveys a message from the communication source user to the communication destination user by: walking from one place to another in the remote location; and having conversations and the like with the communication destination user.

It should be noted that the communication destination devices are not specifically limited to the above-discussed telepresence robots, and are variously changeable. Other communication destination devices may be used. Examples of them include: a stationary communication robot which does not walk autonomously; a personal computer and an artificial intelligence speaker which are placed in a predetermined location; and an autonomous car which is capable of autonomously running without being driven by a person.

The cloud server 3 includes, for example, a processor, a memory, a communication unit, and an external storage device. The cloud server 3 is communicably connected to the telepresence robots 1a to 1n and the communication device 4 via wired or wireless communication lines (not illustrated). The cloud server 3 is an example of a communication controller which controls communications between the communication device 4 and the telepresence robots 1a to 1n. Incidentally, the communication controller is not specifically limited to the cloud server 3, and is variously changeable. For example, the telepresence robot may perform the functions of the cloud server 3. Otherwise, a communication terminal, such as a smartphone, a tablet or a personal computer, may perform the functions of the cloud server 3.

The communication device 4 is made of a tablet or the like, for example. The communication device 4 is an example of a communication source device which is used in an office or the like in a location remote from the communication destination user, and which is used by the communication source user. Incidentally, the communication device 4 is not specifically limited to the above-mentioned example, and is variously changeable. For example, as the communication device 4, multiple communication devices may be used.

Otherwise, as the communication device 4, a different communication terminal such as a smartphone or a personal computer may be used. Furthermore, as the communication device 4, a telepresence robot which has the same configuration as the telepresence robot 1 may be used.

Figure 2:
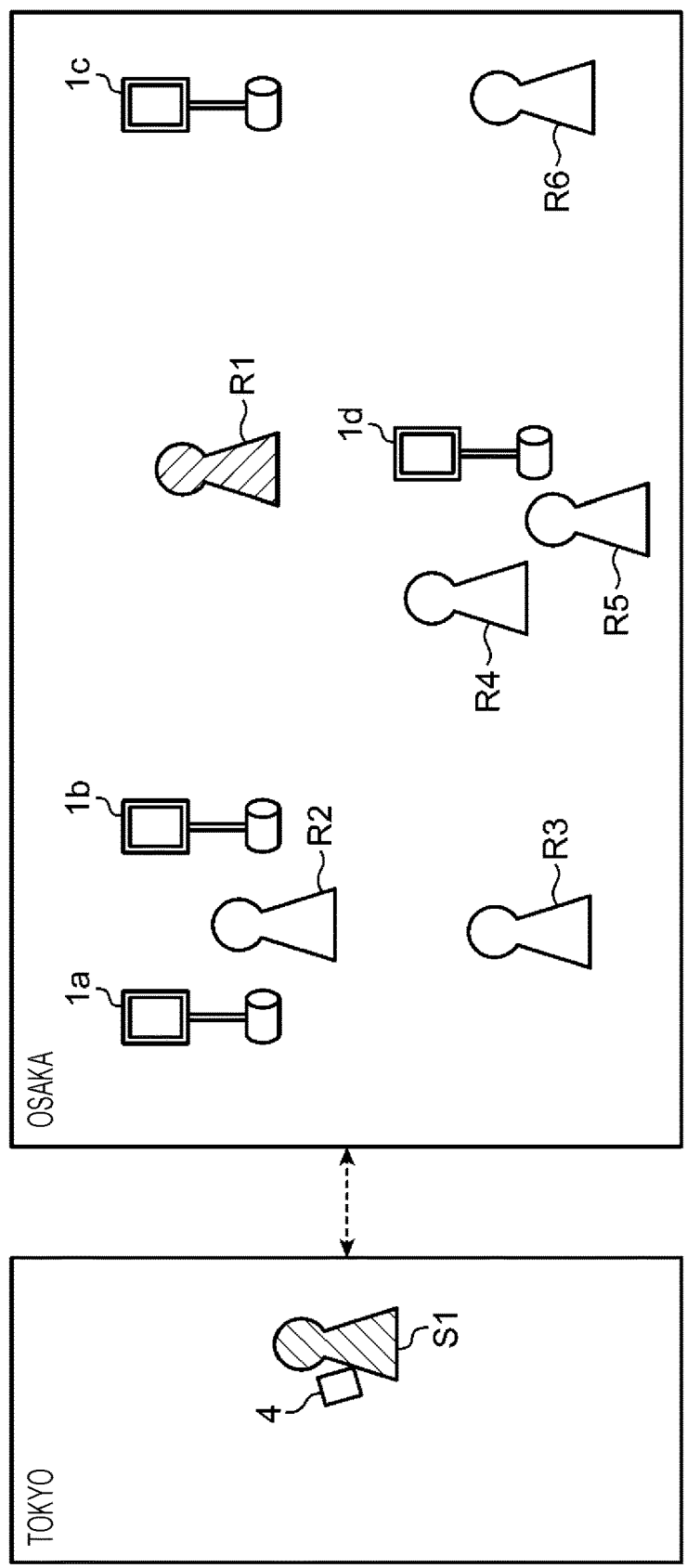
FIG. 2 is a schematic diagram illustrating an example of how the communication system illustrated in FIG. 1 is used.

FIG. 2 is a schematic diagram illustrating an example of how the communication system illustrated in FIG. 1 is used. Let us assume a case where, for example, a user S1 in an office in Tokyo wishes to have a telepresence meeting with a user R1 in an office in Osaka using the communication device 4.

As illustrated in FIG. 2, the Osaka office has not only the user R1 but also many other users R2 to R6. Furthermore, in the Osaka office, telepresence robots 1a to 1d are in standby-mode. The users R1 to R6 and the telepresence robots 1a to 1 d are moving depending on their necessity. Moreover, the telepresence robots 1a to 1d each include: a substantially column-shaped autonomous mobile unit for autonomous movement; a tablet-shaped presentation unit which gives a user a telepresence presentation; and a connecting portion which connects the autonomous mobile unit and the presentation unit.

In the example illustrated in FIG. 2, the nearest telepresence robot to the user R1 is a telepresence robot 1d. The cloud server 3 communicably connects the communication device 4 and the telepresence robot 1d based on a communication control process, although described later. The telepresence robot 1d goes near to the user R1 by autonomously moving looking for the user R1, or by moving based on an input from the user S1. While in this state, the user S1 in the Tokyo office sends the telepresence robot 1d a message and the like inputted using the communication device 4, and the telepresence robot 1d gives the user R1 in the Osaka office the message and the like from the user S1 in the Tokyo office.

Referring to FIG. 1 again, the telepresence robot 1 includes a camera 11, a video obtainer 12, a microphone 13, a voice obtainer 14, a touch panel 15, an operation information obtainer 16, a communicator 17, a drive controller 18, a motor 19, a video reproducer 20, a display 21, a voice reproducer 22 and a speaker 23. The cloud server 3 includes a communicator 31, a person determiner 32, a user database (DB) 33, a neighborhood information manager 34, a neighborhood information database (DB) 35, a time information obtainer 36, and an interactive connection processor 37. The communication device 4 includes a communicator 41, an operation unit 42, a display 43 and an image/voice captor 44.

The camera 11 of the telepresence robot 1 is made, for example, of an omnidirectional camera which is capable of obtaining an omnidirectional image. The camera 11 captures an image of all users present around the telepresence robot 1 at any time or at regular time intervals, and outputs a data item on the captured image to the video obtainer 12. The data item on the captured image is used as a user determination data item for determining which users are present around the telepresence robot 1. Incidentally, the camera 11 is not specifically limited to the above-mentioned example, and is variously changeable. For example, an image captor which obtains an omnidirectional image by moving a camera capable of capturing a unidirectional image may be used.

After obtaining the image data item from the camera 11, the video obtainer 12 outputs the image data item to the communicator 17. To put it specifically, while the telepresence robot 1 is performing a telepresence action, the video obtainer 12 outputs to the communicator 17 the image data item obtained by capturing the image of the communication destination user of the telepresence action target, and the communicator 17 outputs to the cloud server 3 the image data item obtained by capturing the image of the communication destination user.

In addition, while the telepresence robot 1 is in standby mode and walking as appropriate without performing the telepresence action, the video obtainer 12 outputs to the communicator 17 a data item on an omnidirectional image of the neighborhood of the telepresence robot 1 (a neighborhood image data item obtained by capturing a 360-degree image of the neighborhood of the telepresence robot 1), as well as a robot identification information item (a communication device identification information item), stored beforehand in an internal memory (not illustrated), for identifying the telepresence robot 1. The communicator 17 outputs the neighborhood image data item and the robot identification information item to the cloud server 3.

It should be noted that neither the camera 11 nor the video obtainer 12 is specifically limited to the above-mentioned example. The camera 11 and the video obtainer 12 may be variously changed. For example, when a different type of data item is used as the user determination data item, a camera and an image obtainer each having only a function needed for the telepresence action may be used.

The microphone 13 includes two or more omnidirectional microphones. The microphone 13 collects voices of all the users present around the telepresence robot 1 at any time or at regular time intervals, and outputs a data item on the collected voices to the voice obtainer 14. The voice data item is used as the user determination data item for determining which users are present around the telepresence robot 1.

After obtaining the voice data item from the microphone 13, the voice obtainer 14 outputs the voice data item to the communicator 17. To put it specifically, while the telepresence robot 1 is performing the telepresence action, the voice obtainer 14 obtains the voice data item by collecting the voice of the communication destination user of the telepresence action target, and outputs the voice data item to the communicator 17. The communicator 17 outputs to the cloud server 3 the voice data item obtained by collecting the voice of the communication destination user.

Furthermore, when the voice data item is used as the user identification data item while the telepresence robot 1 is in standby mode and roaming as appropriate without performing the telepresence action, the voice obtainer 14 outputs to the communicator 17 an omnidirectional voice data item on the voices collected omnidirectionally from the telepresence robot 1 (a neighborhood voice collection data item obtained by collecting the voices from the 360-degree neighborhood of the telepresence robot 1), as well as the robot identification information item (the communication device identification information item), stored beforehand in the internal memory (not illustrated), for identifying the telepresence robot 1. The communicator 17 outputs the neighborhood voice data item and the robot identification information item to the cloud server 3.

It should be noted that neither the microphone 13 nor the voice obtainer 14 is specifically limited to the above example. The microphone 13 and the voice obtainer 14 may be variously changed. For example, when a different type of data item is used as the user identification data item, a microphone and a voice obtainer each having only a function needed for the telepresence action may be used.

While the telepresence robot 1 is performing the telepresence action, the touch panel 15 is used by the communication destination user to input various operation information items and the like. The touch panel 15 outputs the various operation information items and the like to the operation information obtainer 16.

After obtaining an operation information item from the touch panel 15, the operation information obtainer 16 outputs the operation information item to the communicator 17. To put it specifically, while the telepresence robot 1 is performing the telepresence action, the operation information obtainer 16 outputs the operation information item on the telepresence action to the drive controller 18, the video reproducer 20 and the voice reproducer 22 via the communicator 17. The telepresence robot 1 performs the telepresence action depending on the operation information item.

It should be noted that when the telepresence robot 1 is used as the communication source device (for example, the communication device 4) used by the communication source user, the operation information obtainer 16 functions as a connection request obtainer. Once the communication source user inputs a communication request, inclusive of the user identification information item on the communication destination user, using the touch panel 15, the operation information obtainer 16 creates a communication request command inclusive of the user identification information item on the communication destination user, and outputs the communication request command to the communicator 17. The communicator 17 outputs the communication request command to the cloud server 3.

The drive controller 18 controls revolutions of the motor 19. Depending on the control of the drive controller 18, the motor 19 drives the driving wheels (not illustrated), and thereby moves or stops the telepresence robot 1. The drive controller 18 and the motor 19 are an example of the autonomous mobile unit which makes the telepresence robot move autonomously.

The video reproducer 20 reproduces a video signal from a video data item and the like on the communication source user obtained from the communication device 4 or the cloud server 3 via the communicator 17, and outputs the video signal to the display 21. The display 21 displays the video and the like of the communication source user. The video reproducer 20 and the display 21 are an example of the presentation unit which presents a message of the communication source user to the communication destination user.

The voice reproducer 22 reproduces a voice signal from a voice data item and the like on the communication source user obtained from the communication device 4 or the cloud server 3 via the communicator 17, and outputs the voice signal to the speaker 23. The speaker 23 reproduces the voice and the like of the communication source user. The voice reproducer 22 and the speaker 23 are another example of the presentation unit which presents the message of the communication source user to the communication destination user.

The communicator 31 of the cloud server 3 communicates with the telepresence robots 1a to 1n and the communication device 4. For example, once the communicator 31 receives the neighborhood image data item and the robot identification information item sent from each of the telepresence robots 1a to 1 n, the communicator 31 outputs the neighborhood image data item to the person determiner 32, as well as the neighborhood image data item and the robot identification information item to the neighborhood information manager 34.

For each of the users (for example, each of all the users in the Osaka office illustrated in FIG. 2), the user DB 33 in advance stores a reference face image data item on the user's face and the user identification information item for identifying the user, which are associated with each other.

The person determiner 32 extracts a face image data item on a user's face from the neighborhood image data item, and compares the face image data item with the reference face image data items stored in the user DB 33. Thereby, the person determiner 32 determines the user included in the neighborhood image data item, reads from the user DB 33 the user identification information item which is associated with the reference face image data item on the determined user, and outputs the user identification information item on the determined user to the neighborhood information manager 34.

The neighborhood information manager 34 obtains from the time information obtainer 36 the time of obtaining the neighborhood image data item, which is used as the last detection time. The neighborhood information manager 34 creates a neighborhood information item in which the last detection time, the user identification information item outputted from the person determiner 32, and the robot identification information item sent together with the neighborhood image data item used to create the user identification information item are associated with one another. The neighborhood information manager 34 stores the neighborhood information item in the neighborhood information DB 35. Thus, the neighborhood information DB 35 stores the neighborhood information item in which the user identification information item created using the neighborhood image data item obtained at the latest acquisition time, and the robot identification information item sent together with the neighborhood image data item are associated with each other. Accordingly, the user identification information item on the determined user, and the robot identification information item for identifying the telepresence robot 1 which is the nearest to the user are stored therein together with the last detection time.

Furthermore, each time the telepresence robots 1a to 1n send their respective neighborhood image data items to the neighborhood information manager 34 within a predetermined period (for example, at substantially the same time), the neighborhood information manager 34 determines whether the same user is identified from the neighborhood image data items. To put it specifically, when the robot identification information items which correspond to the user identification information items on the same user sent from the person determiner 32 to the neighborhood information manager 34 within the predetermined period are different from one another, that is to say, when the same user is determined from the neighborhood image data items sent from the telepresence robots 1a to 1n to the neighborhood information manager 34 within the predetermined period, the neighborhood information manager 34 instructs the person determiner 32 to make the person determination again.

From all the face image data items on the same user, respectively, the person determiner 32 extract face image areas representing the face of the user. The person determiner 32 compares a face image data item from which a face image area with the largest area is extracted with the reference face image data items. Thereby, the person determiner 32 determines the user from the face image data item from which the face image area with the largest area is extracted. The person determiner 32 reads from the user DB 33 the user identification information item associated with the reference face image data time on the determined user, and outputs the user identification information item to the neighborhood information manager 34. In this respect, the face image area extracting process may be performed using various methods. For example, the person determiner 32 creates rectangles circumscribed around the outlines of the faces which are respectively extracted from all the face image data items on the same user, and compares the areas W×H of the rectangles where W and H denote the lengths of the vertical and horizontal sides of each rectangle. Thereby, the person determiner 32 can determine the face image data item from which the face image area with the largest area is extracted.

The neighborhood information manager 34 obtains from the time information obtainer 36 the time of obtaining the neighborhood image data item from which the face image data item corresponding to the face image area with the largest area is extracted. The time of obtaining the neighborhood image data item is used as the last detection time. The neighborhood information manager 34 creates a neighborhood information item in which the last detection time, the user identification information item outputted from the person determiner 32 and corresponding to the face image data item from which the face image area with the largest area is extracted, as well as the robot identification information item sent together with the neighborhood image data item used to create the user identification information item are associated with one another. The neighborhood information manager 34 stores the neighborhood information item in the neighborhood information DB 35.

Thus, when the same user is determined from the neighborhood image data items which are sent from the telepresence robots 1a to 1n within the predetermined period, the neighborhood information DB 35 stores the neighborhood information item in which the user identification information item corresponding to the face image data item from which the face image area with the largest area is extracted, and the robot identification information item sent together with the neighborhood image data item used to create the user identification information item are associated with one another. Accordingly, the user identification information item on the determined user, and the robot identification information item for identifying the telepresence robot 1 which is the nearest to the user are stored therein together with the last detection time.

Furthermore, when multiple users are determined from a neighborhood image data item, the person determiner 32 extracts face image data items on the multiple users' faces, and compares each of the face image data items with the reference face image data items. Thereby, the person determiner 32 determines the multiple users included in the neighborhood image data item, and reads from the user DB 33 the user identification information items associated with the reference face image data items on the multiple determined users. The person determiner 32 outputs the user identification information items to the neighborhood information manager 34.

The neighborhood information manager 34 obtains from the time information obtainer 36 a time of obtaining the neighborhood image data item, which is used as the last detection time. For each of the multiple users, the neighborhood information manager 34 creates the neighborhood information item in which the last detection time, the user identification information item outputted from the person determiner 32, and the robot identification information item sent together with the neighborhood image data item used to create the user identification information item are associated with one another, as well as stores the neighborhood information item in the neighborhood information DB 35. Thus, for each of the multiple users, the neighborhood information DB 35 stores the neighborhood information item in which the user identification information item corresponding to the image data item acquired at the latest acquisition time, and the robot identification information item sent together with the image data item are associated with each other. Accordingly, the user identification information items on the multiple determined users, and the robot identification information items for identifying the telepresence robots 1 which are the nearest to the users are stored therein together with the latest detection times, respectively.

For the purpose of using the voice data items as the user determination data items, the user DB 33 may be configured to, for each of the multiple users (for example, each of all the users in the Osaka off illustrated in FIG. 2), associate and store a reference voice data item on the voice of the user and the user identification information item for identifying the user. In this case, the person determiner 32 compares a voice data item received from the communicator 31 with the reference voice data items stored in the user DB 33 (by speaker verification using voiceprints). Thereby, the person determiner 32 determines a user who utters the voice, reads from the use DB 33 the user identification information item associated with the reference voice data item on the determined user, and outputs the user identification information item on the determined user to the neighborhood information manager 34.

The neighborhood information manager 34 obtains from the time information obtainer 36 a time of obtaining the voice data item as the latest detection time, and creates the neighborhood information item in which the latest detection time, the user identification information item outputted from the person determiner 32, and the robot identification information item sent together with the voice data item used to create the user identification information item are associated with one another. The neighborhood information manager 34 stores the neighborhood information item in the neighborhood information DB 35. Thus, the neighborhood information DB 35 stores the neighborhood information item in which the user identification information item corresponding to the voice data item acquired at the latest acquisition time, and the robot identification information item sent together with the voice data item are associated with each other. Accordingly, the user identification information item on the determined user, and the robot identification information item for identifying the telepresence robot 1 which is the nearest to the user are stored therein together with the latest detection time.

Furthermore, each time the telepresence robots 1a to 1n send their respective voice data items to the neighborhood information manager 34 within the predetermined period (for example, at substantially the same time), the neighborhood information manager 34 may determine whether the same user is identified from the voice data items. When the robot identification information items which correspond to the user identification information items on the same user sent from the person determiner 32 to the neighborhood information manager 34 within the predetermined period are different from one another, that is to say, when the same user is determined from the neighborhood image data items sent from the telepresence robots 1a to 1n to the neighborhood information manager 34 within the predetermined period, the neighborhood information manager 34 instructs the person determiner 32 to make the person determination again.

Using the all the voice data items on the same determined user, the person determiner 32 detects the voice source location of each voice data item relative to the telepresence robot 1. The person determiner 32 compares a voice data item, the distance of whose voice source location from a corresponding telepresence robot 1 is the shortest among the distances of the voice source locations of the voice data items from the telepresence robots 1, with the reference voice data items. Thereby, the person determiner 32 determines the user related to the voice data item, the distance of whose voice source location from the corresponding telepresence robot 1 is the shortest. The person determiner 32 reads from the user DB 33 the user identification information item associated with the reference voice data item on the determined user, and outputs the user identification information item to the neighborhood information manager 34. In this respect, the voice source location estimating process using the multiple microphones may be achieved using various methods. For example, Time Difference of Arrival (TDOA) using the time difference in arrival of sound waves which occurs among the obtained voice data items, or other methods may be employed for the process.

The neighborhood information manager 34 obtains from the time information obtainer 36 a time of obtaining the voice data item, the distance of whose voice source location from the corresponding telepresence robot 1 is the shortest, as the latest detection time. The neighborhood information manager 34 creates the neighborhood information item in which the latest detection time, the user identification information item outputted from the person determiner 32 and related to the voice data item, the distance of whose voice source location from the corresponding telepresence robot 1 is the shortest, as well as the robot identification information item sent together with the voice data item used to create the user identification information item are associated with one another. The neighborhood information manager 34 stores the neighborhood information item in the neighborhood information DB 35.

Thus, when the same user is determined from the voice data items sent from the telepresence robots 1a to 1n within the predetermined period, the neighborhood information DB 35 stores the neighborhood information item in which the user identification information item related to the voice data item, the distance of whose voice source location from the corresponding telepresence robot 1 is the shortest, and the robot identification information item sent together with the voice data item used to create the user identification information item are associated with each other. Accordingly, the user identification information item on the determined user, and the robot identification information item for identifying the telepresence robot 1 which is the nearest to the user are stored therein together with the last detection time.

Besides, the user determination data item is not limited to the above-discussed example. A different type of data item may be used as long as it makes it possible to identify the telepresence robot 1 which is the nearest to the user. For example, each of the communicators 17 of the telepresence robots 1a to 1n may be configured to receive a beacon signal, inclusive of the user identification information item for identifying a user present around the communicator 17, from a transmitter (not illustrated) owned by the user, and to send the cloud server 3 an intensity information item on the intensity of the radio wave of the received beacon signal, the user identification information item, and the robot identification information item for identifying the telepresence robot 1.

In this case, the communicator 31 of the cloud server 3 receives the intensity information item, the user identification information item, and the robot identification information item from each of the telepresence robots 1a to 1 n. The neighborhood information manager 34 obtains from the time information obtainer 36 a time of obtaining the user identification information item and the robot identification information item sent together with the intensity information item on a beacon signal with the largest radio wave intensity as the last detection time. The neighborhood information manager 34 creates the neighborhood information item in which the last detection time, the user identification information item and the robot identification information item are associated with one another. The neighborhood information manager 34 stores the neighborhood information item in the neighborhood information DB 35.

Thus, the neighborhood information DB 35 stores the neighborhood information item in which the user identification information item corresponding to the intensity information item on the beacon signal with the largest radio wave intensity and the like acquired at the latest acquisition time, and the robot identification information item sent together with the user identification information item are associated with each other. Accordingly, the user identification information item on the determined user, and the robot identification information item for identifying the telepresence robot 1 which is the nearest to the user are stored therein together with the last detection time.

The communicator 41 of the communication device 4 communicates with the cloud server 3 (and/or the telepresence robots 1a to 1n). From the telepresence robot 1 used by the communication destination user, the communicator 41 receives the image data item obtained by capturing the image of the communication destination user, the voice data item obtained by collecting the voice of the communication destination user, and the like via the cloud server 3 (or directly).

The operation unit 42 is made, for example, of a touch panel or the like. The communication source user uses the operation unit 42 to input various operation information items and the like for the purpose of implementing the telepresence (for example, a conversation with the communication destination user).

The display 43 is made of a display, a speaker and/or the like which are capable of reproducing images and/or voices. From the telepresence robot 1 used by the communication destination user or the cloud server 3, the image data item obtained by capturing the image of the communication destination user, the voice data item obtained by collecting the voice of the communication destination user, and the like are inputted into the display 43 via the communicator 41. The display 43 displays the image of the communication destination user, and reproduces the voice of the communication destination user.

The image/voice captor 44 is made, for example, of a camera, a microphone and/or the like. The image/voice captor 44 captures the image of the communication source user at any time or at regular time intervals, as well as sends the image data item obtained by capturing the image of the communication source user and the voice data item obtained by collecting the voice of the communication source user to the cloud server 3 or the telepresence robot 1 used by the communication destination user via the communicator 41.

In addition, once the communication source user inputs a communication request, inclusive of the user identification information item on the communication destination user, using the operation unit 42, the operation unit 42 creates a communication request command, inclusive of the user identification information item on the communication destination user, and outputs the communication request command to the communicator 41. The communicator 41 sends the communication request command to the cloud server 3.

The communicator 31 of the cloud server 3 receives the communication request command, and outputs the communication request command to the interactive connection processor 37. Upon receipt of the communication request command, the interactive connection processor 37 refers to the neighborhood information items in the neighborhood information DB 35, and communicably connects the communication device 4 and the telepresence robot 1 identified based on the robot identification information item which is associated with the user identification information item on the communication destination user. Thus, the communication device 4 is capable of communicating with the telepresence robot 1 which is the nearest to the communication destination user. Hence, the communication source user is capable of implementing the telepresence with the communication destination user using the telepresence robot 1 which is the nearest to the communication destination user.

Figure 3:
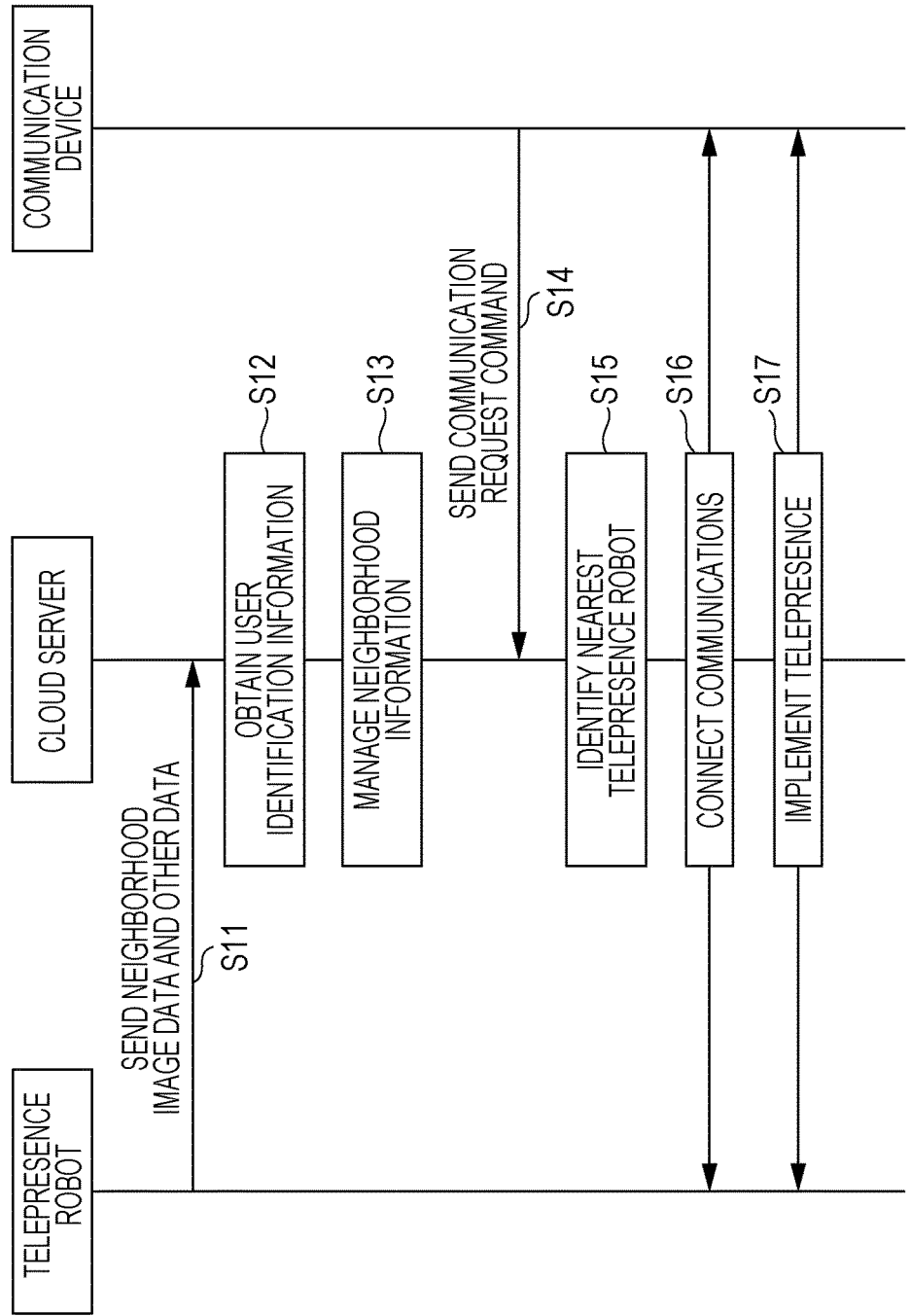
FIG. 3 is a sequence chart illustrating an example of how the communication system illustrated in FIG. 1 performs a communication control process.

Next, descriptions will be provided for how the above-configured communication system performs the communication control process. FIG. 3 is a sequence chart illustrating an example of how the communication system illustrated in FIG. 1 performs the communication control process. Incidentally, the process to be performed using a neighborhood image data item as a user determination data item will be discussed below.

First of all, each of the telepresence robots 1a to 1n creates a neighborhood image data item by capturing a 360-degree image of the neighborhood of the telepresence robot 1 at any time or at regular time intervals, sends the neighborhood image data item and the robot identification information item on the telepresence robot to the cloud server 3 (step S11).

Thereafter, the cloud server 3 receives the neighborhood image data item and the robot identification information item which are sent from each of the telepresence robots 1a to 1n. The person determiner 32 of the cloud server 3 extracts a face image data item from the neighborhood image data item, and compares the face image data item with the reference face image data items stored in the user DB 33. Thereby, the person determiner 32 determines the user included in the neighborhood image data item, obtains from the user DB 33 the user identification information item associated with the reference face image data item on the determined user, and outputs the user identification information item to the neighborhood information manager 34 (step S12).

Subsequently, the neighborhood information manager 34 obtains from the time information obtainer 36 the time of obtaining the neighborhood image data item as the last detection time. The neighborhood information manager 34 sequentially registers into the neighborhood information DB 35 the neighborhood information item in which the last detection time, the user identification information item outputted from the person determiner 32, and the robot identification information item sent together with the neighborhood image data item used to create the user identification information item are associated with one another. For each determined user, the neighborhood information manager 34 manages the latest neighborhood information item (step S13).

Figure 4:
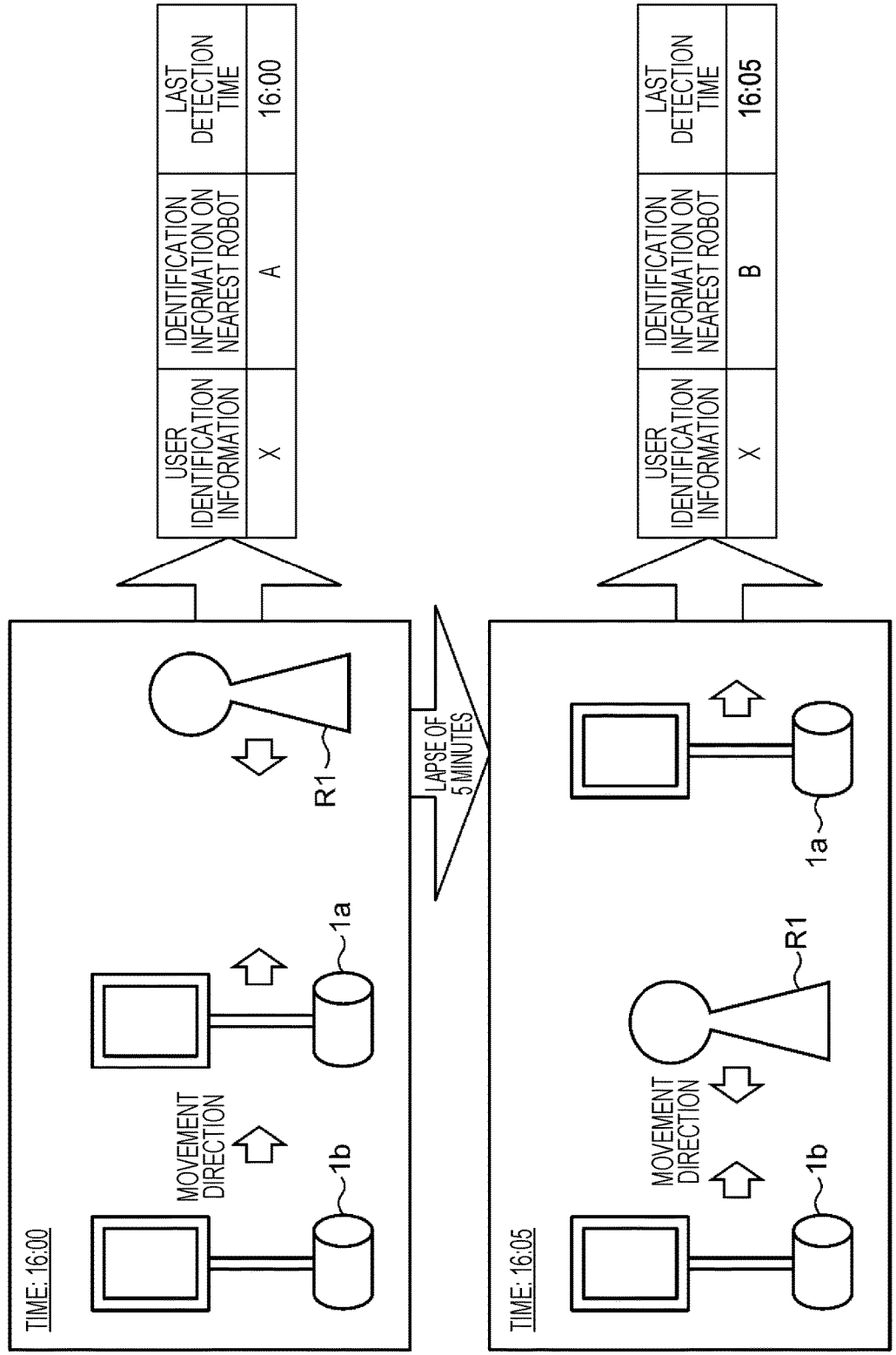
FIG. 4 is a schematic diagram for explaining an example of how a cloud server illustrated in FIG. 1 performs a neighborhood information management process.

In this respect, specific descriptions will be provided for the above-mentioned neighborhood information management process (step S13). FIG. 4 is a schematic diagram for explaining an example of how the cloud server 3 illustrated in FIG. 1 performs the neighborhood information management process. For example, let us assume a scene in which, as illustrated in the upper left in FIG. 4, while the user R1 is moving in an arrow-indicated progressing direction, the telepresence robot 1a is moving toward the user R1, and the telepresence robot 1b in a location away from the telepresence robot 1a is also moving toward the user R1.

In this scene, at time of 16:00, the neighborhood image data item of the telepresence robot 1b includes no image of the user R1, and the neighborhood image data item of the telepresence robot 1a includes the image of the user R1. In this case, the telepresence robot 1a sends the cloud server 3 the neighborhood image data item including the user R1, and the robot identification information item "A" of its own. The person determiner 32 of the cloud server 3 determines the user R1 from the neighborhood image data item of the telepresence robot 1a, and outputs to the neighborhood information manager 34 the user identification information item "X" on the determined user R1.

At this moment, as illustrated in the upper right in FIG. 4, the neighborhood information manager 34 registers into the neighborhood information DB 35 the neighborhood information item in which the user identification information item "X" on the user R1, the robot identification information item "A" on the telepresence robot being the nearest to the user R1, and the last detection time "16:00" are associated with one another.

Thereafter, as illustrated in the lower left in FIG. 4, the telepresence robot 1a passes by the user R1 at time "16:05," and continues moving in an arrow-indicated direction to get away from the user R1. Thus, the neighborhood image data item of the telepresence robot 1a no longer includes the image of the user R1. On the other hand, the telepresence robot 1b and the user R1 move in their respective arrow-indicated directions, and get closer to each other. Thus, the neighborhood image data item of the telepresence robot 1b starts to include the image of the user R1.

For this reason, the telepresence robot 1b sends the cloud server 3 the neighborhood image data item including the user R1, and the robot identification information item "B" of its own. The person determiner 32 of the cloud server 3 determines the user R1 from the neighborhood image data item of the telepresence robot 1b, and outputs to the neighborhood information manager 34 the user identification information item "X" on the determined user R1.

At this moment, as illustrated in the lower right in FIG. 4, the neighborhood information manager 34 registers into the neighborhood information DB 35 the neighborhood information item in which the user identification information item "X" on the user R1, the robot identification information item "B" on the telepresence robot being the nearest to the user R1, and the last detection time "16:05" are associated with one another. Thereby, the neighborhood information manager 34 updates the neighborhood information item on the user R1. In this way, for each determined user, the neighborhood information manager 34 updates the neighborhood information DB 35 using the neighborhood information item corresponding to the last detection time, and registers the robot identification information item on the telepresence robot 1 which is the nearest to the determined user.

Referring to FIG. 3 again, once the communication source user inputs a communication request, inclusive of the user identification information item on the communication destination user, using the operation unit 42 of the communication device 4, the operation unit 42 creates a communication request command inclusive of the user identification information item on the communication destination user, and outputs the communication request command to the communicator 17. The communicator 17 sends the communication request command to the cloud server 3 (step S14).

Thereafter, the communicator 31 of the cloud server 3 receives the communication request command, and outputs the communication request command to the interactive connection processor 37. The interactive connection processor 37 refers to the neighborhood information item in the neighborhood information DB 35, reads from the neighborhood information DB 35 the robot identification information item associated with the user identification information item on the communication destination user, and identifies the telepresence robot 1 which is the nearest to the communication destination user (step S15).

Thus, the interactive connection processor 37 communicably connects the identified telepresence robot 1 and the communication device 4 (step S16).

Next, the interactive connection processor 37 implements the telepresence between the communication source user and the communication destination user using the communication device 4 and the telepresence robot 1 which is the nearest to the communication destination user by: sending a message and the like of the communication source user from the communication device 4 to the telepresence robot 1; and sending a message and the like of the communication destination user from the telepresence robot 1 to the communication device 4 (step S17). Thereby, it is possible to give the communication source user a sense of presence as if the communication source user and the communication destination user in the remote location met each other at one place.

Figure 5:
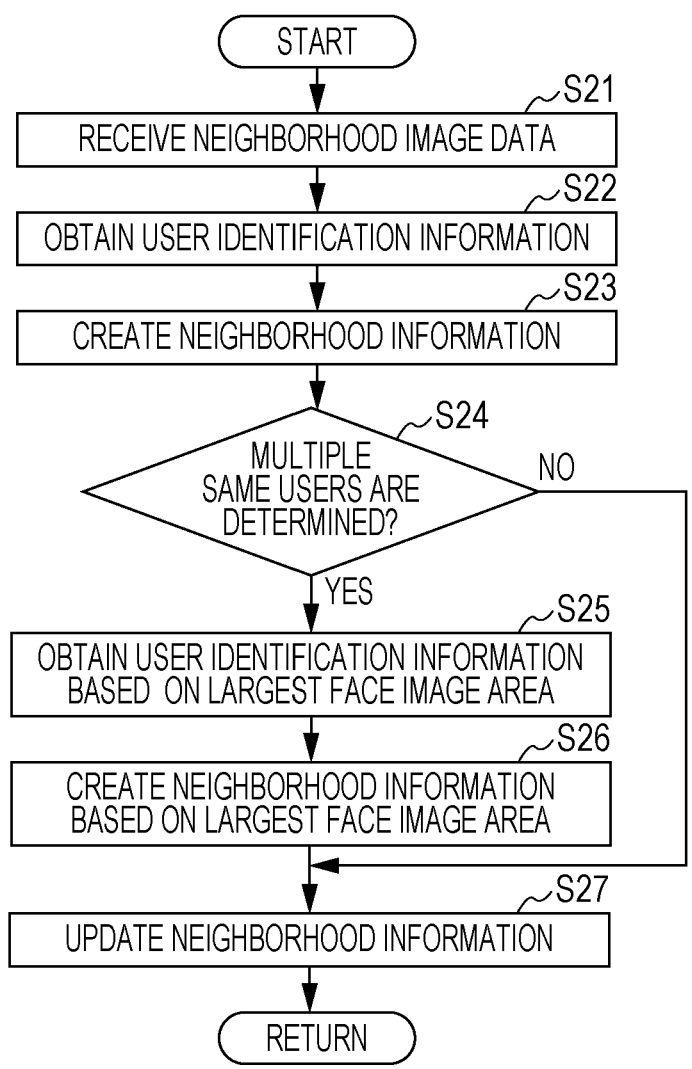
FIG. 5 is a flow chart illustrating an example of how the cloud server illustrated in FIG. 1 performs a neighborhood information update process.

Next, further detailed descriptions will be provided for the neighborhood information update process to be performed by the cloud server 3 in the communication control process which the above communication system performs. FIG. 5 is a flow chart illustrating an example of how the cloud server 3 illustrated in FIG. 1 performs the neighborhood information update process.

First of all, the communicator 31 of the cloud server 3 receives the neighborhood image data item and the robot identification information item which are sent from each of the telepresence robots 1a to 1n (step S21).

Thereafter, the person determiner 32 extracts a face image data item from the neighborhood image data item, and compares the face image data item with the reference face image data items stored in the user DB 33. Thereby, the person determiner 32 determines the user included in the neighborhood image data item, and obtains the from the user DB 33 the user identification information item associated with the reference face image data item on the determined use, and outputs the user identification information item to the neighborhood information manager 34 (step S22).

After that, the neighborhood information manager 34 obtains from the time information obtainer 36 the time of obtaining the neighborhood image data item as the last detection time. The neighborhood information manager 34 creates the neighborhood information item in which the last detection time, the user identification information item outputted from the person determiner 32, and the robot identification information item sent together with the neighborhood image data item used to create the user identification information item are associated with one another (step S23).

Subsequently, the neighborhood information manager 34 checks the neighborhood image data items which it has created within the predetermined period, and determines whether the same user is determined from the neighborhood image data items (step S24). In a case where no same user is determined (NO in step S24), the process proceeds to step S27.

On the other hand, in a case where the same user is determined (YES in step S24), the neighborhood information manager 34 instructs the person determiner 32 to make a person redetermination based on the largest face image area. The person determiner 32 extracts face image areas representing the same user's face, respectively, from all the face image data items on the user. The person determiner 32 compares the face image data item inclusive of the face image area having the largest area with the reference face image data items. Thereby, the person determiner 32 determines the user from the face image data item inclusive of the face image area having the largest area. The person determiner 32 obtains from the user DB 33 the user identification information item associated with the reference face image data item on the determined user, and outputs the user identification information item to the neighborhood information manager 34 (step S25).

Thereafter, the neighborhood information manager 34 obtains from the time information obtainer 36 the time of obtaining the neighborhood image data item as the last detection time. The neighborhood information manager 34 creates the neighborhood information item, based on the largest face image area, in which the last detection time, the user identification information item outputted from the person determiner 32, and the robot identification information item sent together with the neighborhood image data item used to create the user identification information item are associated with one another (step S26).

Then, the neighborhood information manager 34 registers the created neighborhood information item into the neighborhood information DB 35, and thereby updates the neighborhood information DB 35 (step S27). Thereafter, the processing in step S21 and the subsequent steps are repeated. Thereby, for each determined user, the neighborhood information manager 34 manages the latest neighborhood information item, and the neighborhood information DB 35 stores the user identification information item on the determined user, and the robot identification information item for identifying the telepresence robot 1 being the nearest to the user, together with the last detection time.

Here, descriptions will be provided for the neighborhood information update process to be performed in a case where: each of the telepresence robots 1a to 1n illustrated in FIG. 1 includes the person determiner 32, the user DB 33, the neighborhood information manager 34, the neighborhood information DB 35, the time information obtainer 36 and the interactive connection processor 37 of the cloud server 3; and each telepresence robot 1 also functions as the communication controller which manages neighborhood information items. In this case, each of the telepresence robots 1a to 1n performs the above-discussed processing from step S21 through step 27, and additionally a neighborhood information handling process, as a synchronization process, involved in making each telepresence robot 1 include the neighborhood information manager 34, as follows.

For example, each telepresence robot 1 possesses a list of the robot identification information items on the other telepresence robots 1, and stores the list in a predetermined storage area, for example, the neighborhood information DB 35.

FIG. 6 is a diagram illustrating an example of a neighborhood information item to be subjected to the neighborhood information management by the telepresence robot 1 illustrated in FIG. 1. FIG. 7 is a diagram illustrating an example of a neighborhood information item obtained after the telepresence robot 1 illustrated in FIG. 1 performs the neighborhood information management.

As illustrated in FIG. 6, the neighborhood information DB 35 stores neighborhood information items each in which a user identification information item, a nearest robot identification information item, a face area, and a last update time (a last detection time) are associated with one another. The neighborhood information DB 35 further stores a synchronization flag indicating whether a neighborhood information item of one telepresence robot is synchronized with those of all the other telepresence robots. The synchronization flag is set when an update is made. In a case illustrated in FIG. 6, a user identification information item "Z," a nearest robot identification information item "C," a face area "40," a last update time "16:03," are associated with one another. No synchronization flag is set for this neighborhood information item.

Let us assume a case where in the above-mentioned situation, for example, a telepresence robot 1 with a robot identification information item "A" detects a face area "70" of a user with a user identification information item "Z" at time "16:10." In this case, time "16:10" is later than the last detection time "16:03" in FIG. 6, and the face area is larger than that in FIG. 6. For this reason, as illustrated in FIG. 7, a neighborhood information item corresponding to the user identification information item "Z" in the neighborhood information DB 35 of the telepresence robot 1 with the robot identification information item "A" is updated, and is flagged by setting a synchronization flag at "1."

After that, the interactive connection processor 37 of the telepresence robot 1 with the robot identification information item "A" broadcasts the neighborhood information item inclusive of the user identification information item "Z," the robot identification information item "A," the face area "70" and the last detection time "16:03" to all the other telepresence robots via the communicator 17.

All the other telepresence robots receive the neighborhood information item. In each telepresence robot, the neighborhood information manager 34 refers to the neighborhood information DB 35. In a case where no bit is set in the synchronization flag field of the corresponding neighborhood information item, the neighborhood information manager 34 updates the neighborhood information DB 35 using the received neighborhood information item. On the other hand, in a case where a bit is set in the synchronization flag field, the neighborhood information manager 34 determines whether the neighborhood information DB 35 is updatable based ion the received neighborhood information item, and updates the neighborhood information DB 35 depending on the determination result.

To put it specifically, the neighborhood information manager 34 compares the face area obtained in the person determination with the face area included in the received neighborhood information item. In a case where the face area included in the received neighborhood information item is larger, the telepresence robot having sent the neighborhood information item, for example, the telepresence robot 1 with the robot identification information item "A" is nearer to the user with the user identification information item "Z." Accordingly, the neighborhood information manager 34 updates the neighborhood information DB 35. In a case where the face area included in the received neighborhood information item is smaller, the neighborhood information manager 34 does not update the neighborhood information DB 35.

Then, after updating the data in the database, each of all the other telepresence robots sends a neighborhood information update completion signal to the telepresence robot having sent the neighborhood information item, for example, the telepresence robot 1 with the robot identification information item "A." After receiving the neighborhood information update completion signal from all the other telepresence robots, the telepresence robot 1 with the robot identification information item "A" clears the synchronization flag.

Even in the case where the telepresence robots 1a to 1n manage neighborhood information items, when one telepresence robot updates a neighborhood information item stored in the neighborhood information DB 35, the one telepresence robot sends the updated neighborhood information item to the other telepresence robots. For this reason, through the above-discussed synchronization process, the telepresence robots 1a to 1n are capable of synchronizing their corresponding neighborhood information items, and accordingly capable of managing the same neighborhood information item.

Figure 8:
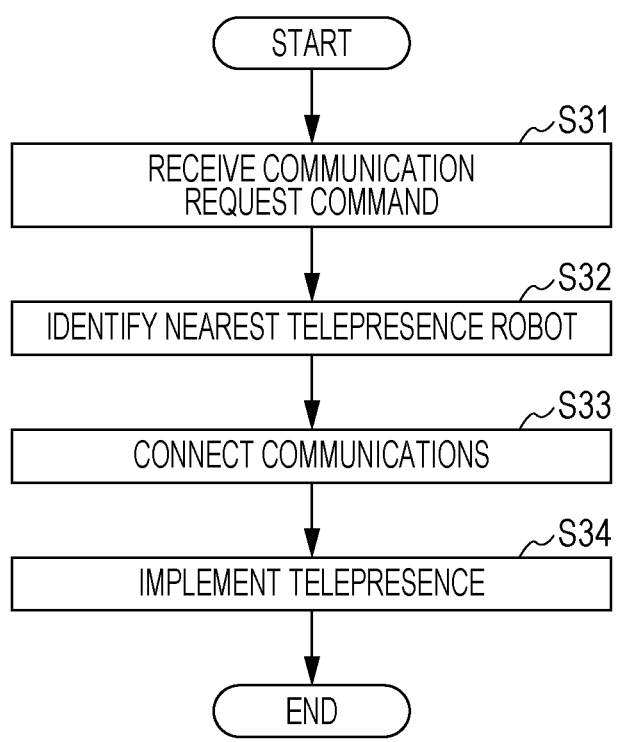
FIG. 8 is a flowchart illustrating an example of how the cloud server illustrated in FIG. 1 performs a communication connection process.

Next, further detailed descriptions will be provided for the communication connection process to be performed by the cloud server 3 in the communication control process which the above communication system performs. FIG. 8 is a flowchart illustrating an example of how the cloud server 3 illustrated in FIG. 1 performs the communication connection process.

First of all, the communication source user inputs the communication request, inclusive of the user identification information item on the communication destination user, using the operation unit 42, and the communicator 17 sends the communication request command to the cloud server 3. The communicator 31 of the cloud server 3 receives the communication request command, and outputs the communication request command to the interactive connection processor 37 (step S31).

Thereafter, the interactive connection processor 37 refers to the neighborhood information item in the neighborhood information DB 35, reads the robot identification information item associated with the user identification information item on the communication destination user, and identifies a telepresence robot 1 which is the nearest to the communication destination user (step S32).

Subsequently, the interactive connection processor 37 communicably connects the identified telepresence robot 1 and the communication device 4 (step S33).

Next, the interactive connection processor 37 implements the telepresence between the communication source user and the communication destination user using the communication device 4 and the telepresence robot 1 which is the nearest to the communication destination user by: sending a message and the like of the communication source user from the communication device 4 to the telepresence robot 1; and sending a message and the like of the communication destination user from the telepresence robot 1 to the communication device 4 (step S34).

In this embodiment, because of the above-discussed process, in the environment where not only the users but also the telepresence robots 1a to 1 n move, the communication device 4 used by the communication source user can be communicably connected to a telepresence robot which is the nearest to the communication destination user among the telepresence robots 1a to 1 n. Thereby, the excellent telepresence can be implemented while creating a sense of presence as if the communication source user and the communication destination user met each other at one place.

Embodiment 2

Figure 9:
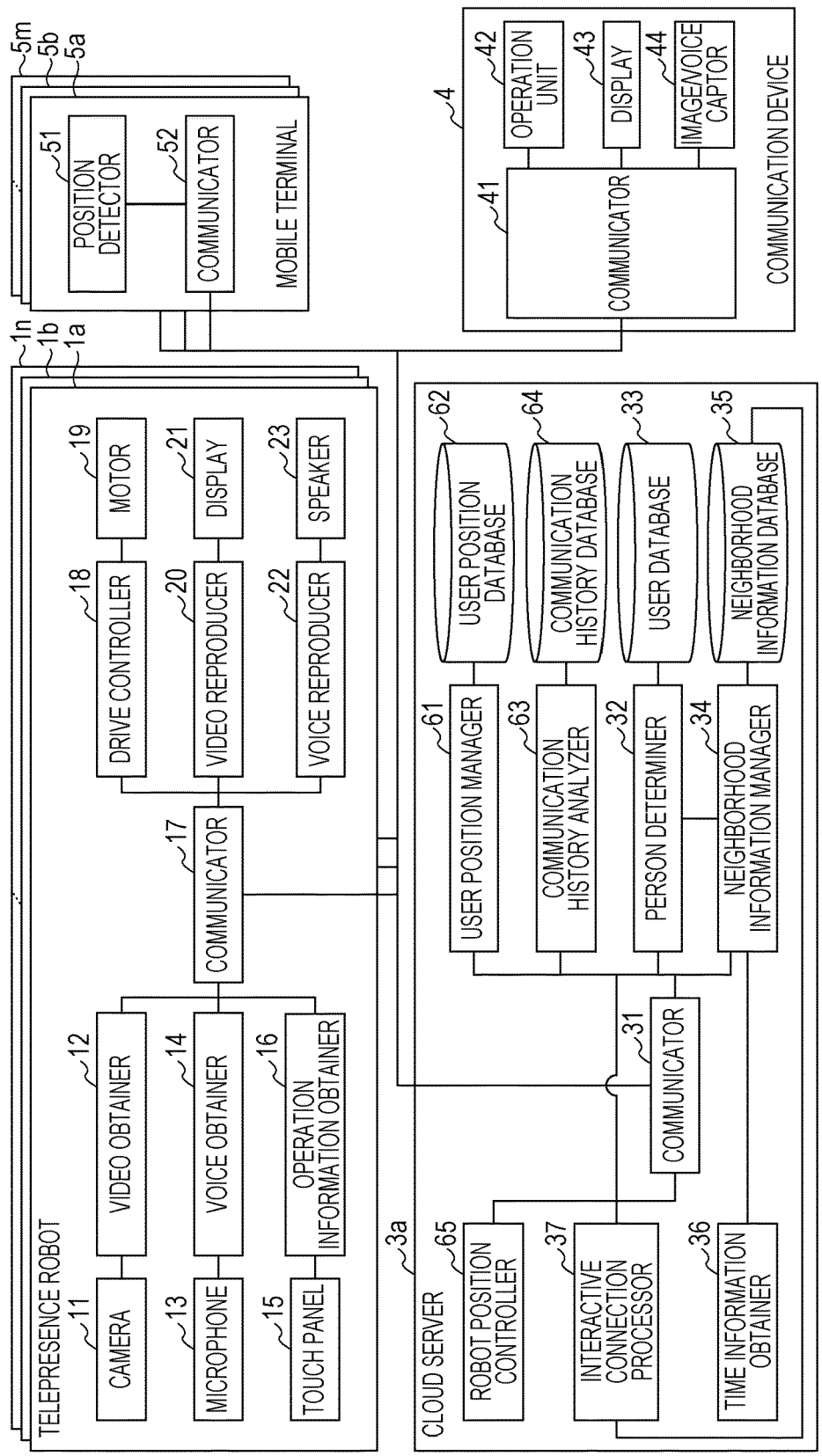
FIG. 9 is a block diagram illustrating an example of a configuration of a communication system according to Embodiment 2 of the present disclosure.

FIG. 9 is a block diagram illustrating an example of a configuration of a communication system according to Embodiment 2 of the present disclosure. What makes the communication system illustrated in FIG. 9 different from the communication system illustrated in FIG. 1 is that: mobile terminals 5a to 5m (hereinafter referred to as a mobile terminal 5) owned by the communication destination users are added to the communication system; and the cloud server 3 is replaced with a cloud server 3a which further includes a user position manager 61, a user position database (DB) 62, a communication history analyzer 63, a communication history database (DB) 64, and a robot position controller 65. The other components of the communication system illustrated in FIG. 9 are the same as the components of the communication system illustrated in FIG. 1. For this reason, the same components will be denoted by the same reference signs, and detailed descriptions for them will be omitted.

In the above-discussed Embodiment 1, the communication device 4 used by the communication source user is communicably connected to the telepresence robot which is the nearest to the communication destination user among the telepresence robots 1a to 1n. In addition to by performing the foregoing process, however, Embodiment 2 makes the telepresence service easy to use for a frequently-accessed user by: identifying the frequently-accessed user from communication destination users based on communication history between the communication device 4 and the telepresence robots 1a to 1 n; and deploying at least one of the telepresence robots 1a to 1n to around the frequently-accessed user.

It should be noted that the cloud server 3a is not specifically limited to the above example. For example, the cloud server 3a may be configured such that: the person determiner 32, the user DB 33, the neighborhood information manager 34, the neighborhood information DB 35, the time information obtainer 36 are removed from the cloud server 3a; and based on the communication history between the communication device 4 and the telepresence robots 1a to 1n, the frequently-accessed user is identified from the communication destination users, and at least one of the telepresence robots 1a to 1n is deployed to around the frequently-accessed user.

Each of the mobile terminals 5a to 5m is made, for example, of a smartphone or the like. Each mobile terminal 5 includes, at least, a position detector 51 and a communicator 52. The position detector 51 detects a user position information item on the current position of the communication destination user in possession of the mobile terminal 5. The communicator 52 sends the detected user position information item and the user identification information item on the communication destination user to the cloud server 3.

For example, Wi-Fi (Registered Trademark) base stations or beacon transmitters are installed in the Osaka office, and the position detector 51 estimates the current position of the communication destination user in possession of the mobile terminal 5 by calculating the difference in the intensities of the radio waves from the Wi-Fi (Registered Trademark) base stations or the beacon transmitters using the Wi-Fi (Registered Trademark) positioning method or the beacon positioning method. Incidentally, the method of detecting the current position of the communication destination user is not specifically limited to the above example. Other methods may be used to detect the current position of the communication destination user. Examples of the other methods include: the pedestrian autonomous navigation method by which the direction and amount of movement of the communication destination user is estimated using the acceleration, magnetism, angular velocity, etc. sensors included in the smartphone or the like of the communication destination user; the indoor messaging system (IMES) positioning method by which a transmitter using the same method (protocol and frequency) as does the global positioning system (GPS) is installed indoor, as well as the indoor and outdoor positions of the communication destination user are seamlessly measured using the conventional GPS reception function of the smartphone; and the acoustic positioning method by which the position of the communication destination user is estimated by receiving an ultrasonic wave generated from a speaker installed indoor by use of the smartphone.

The communicator 31 of the cloud server 3a receives the user position information items on the current positions of the communication destination users and the user identification information items on the communication destination users which are respectively sent from the mobile terminals 5a to 5m. The communicator 31 outputs the user position information items and the user identification information items to the user position manager 61. The user position manager 61 stores the user position information items and the user identification information items in the user position DB 62.

In this respect, in this embodiment, the operation unit 42 of the communication device 4 creates a communication request command inclusive of: the user identification information item on the communication source user who is going to communicate using the communication device 4; and the user identification information item on the communication destination user. The operation unit 42 outputs the communication request command to the communicator 41. The communicator 41 sends the communication request command to the cloud server 3a.

When communicably connecting the telepresence robot 1 and the communication device 4, the interactive connection processor 37 outputs to the communication history analyzer 63 a communication history information item between the telepresence robot 1 and the communication device 4, which includes: user identification information items on communication destination users who communicate using the telepresence robot 1; time information items on times when the communication destination users start to use the telepresence robot 1; and user identification information items on communication source users who communicate using the communication device 4. The communication history analyzer 63 stores the communication history information item in the communication history DB 64.

FIG. 10 is a diagram illustrating an example of the communication history information item to be stored in the communication history database illustrated in FIG. 9. As for the communication history information item, as illustrated in FIG. 10, the communication history DB 64 stores the time information items in the "time" field for the communication start time, the user identification information items on communication source users in the "identification information on communication source user" field, and the user identification information items on communication destination users in the "identification information on communication destination user" field. For example, in a case where a communication source user with a communication source user identification information "a" starts to communicate with a communication destination user with a communication destination user identification information "X" at "10:20," the communication history DB 64 associates and stores the time "10:20," the communication source user identification information "a" and the communication destination user identification information "X."

It should be noted that the time information item is not specifically limited to the above-mentioned communication start time, and may be variously changed. For example, the time information item may use a communication time length which is identified using a communication start time and a communication end time, or may use a communication end time alone.

The communication history analyzer 63 refers to the communication history information item in the communication history DB 64, identifies a communication destination user with a communication frequency higher than a predetermined value as a frequently-accessed person, and outputs the user identification information item on the identified communication destination user to the robot position controller 65. For example, the communication history analyzer 63 identifies several persons with highest communication frequencies as frequently-accessed persons, or a person with the highest communication frequency as a frequently-accessed person, or a person with a communication frequency within a predetermined period higher than a predetermined value.

In the example illustrated in FIG. 10, because the communication destination user with the user identification information "X" has been accessed most frequently, the communication history analyzer 63 identifies the communication destination user with the user identification information "X" as the frequently-accessed person.

Furthermore, the communication history analyzer 63 may be configured to refers to the communication history information item in the communication history DB 64, to identify a time length in which the communication frequency of the communication destination user is higher than a predetermined value, and to output to the robot position controller 65 a time length information item on the identified time length together with the user identification information item on the communication destination user with the communication frequency higher than the predetermined value. For example, the communication history analyzer 63 classifies the communication time into a morning communication time period and an afternoon communication time period. In this case, the communication history analyzer 63 identifies several persons with highest communication frequencies in the morning or afternoon as frequently-accessed persons, or a person with the highest communication frequency in the morning or afternoon as a frequently-accessed person, or a person with a communication frequency in the morning or afternoon higher than a predetermined value as a frequently-accessed person.

In the example illustrated in FIG. 10, the communication frequency in the morning of the communication destination user with the user identification information "X" is the highest. For this reason, the communication history analyzer 63 identifies the communication destination user with the user identification information "X" as the frequently-accessed person, and identifies "morning" as a time period in which the communication frequency of the communication destination user is higher than the predetermined value. Incidentally, the time period classification is not specifically limited to the above example, and may be variously changed. For example, an hour may be used as the time period such that in every hour, several persons with highest communication frequencies or a person with the highest communication frequency is identified as a frequently-accessed person(s).

Using the user position manager 61, the robot position controller 65 reads from the user position DB 62 the user position information item on the current position of the communication destination user identified by the communication history analyzer 63. In order to move at least one of the telepresence robots 1a to 1n to around the identified communication destination user, the robot position controller 65 sends a movement order to the at least one telepresence robot using the communicator 31.

To put it specifically, the robot position controller 65 refers to the neighborhood information DB 35 using the neighborhood information manager 34, and determines whether there exists a telepresence robot around the identified communication destination user, for example, within a certain distance from the identified communication destination user. In a case where no telepresence robot exists within the certain distance, the robot position controller 65 identifies a telepresence robot which is the nearest to the identified communication destination user, and sends the identified telepresence robot the movement order to move the telepresence robot to around the identified communication destination user.

In this case, the telepresence robot in receipt of the movement order moves to around the identified communication destination user, for example, within a distance of 1 meter or less from the identified communication destination user, and thereafter follows the identified communication destination user while keeping the distance. For this reason, as many communicable telepresence robots as possible are deployed around the frequently-accessed person. Even in a case where one of the telepresence robots around the frequently-accessed person is used for any other person, the other telepresence robots remain stationed around the frequently-accessed person.

Furthermore, in a case where a time range is identified, the robot position controller 65 sends a movement order to move at least one of the telepresence robots 1a to 1n to stay around the communication destination user for the identified time range, to the at least one telepresence robot using the communicator 31.

In this case, the telepresence robot in receipt of the movement order moves to around the identified communication destination user, for example, within a distance of 1 meter or less from the identified communication destination user before the identified time range, and thereafter follows the identified communication destination user while keeping the distance for the identified time range. For this reason, around a person who is accessed frequently in the morning, as many communicable telepresence robots as possible are deployed in the morning. Even in a case where one of the telepresence robots around the frequently-accessed person is used for any other person, the other telepresence robots remain stationed around the frequently-accessed person in the morning.

Figure 11:
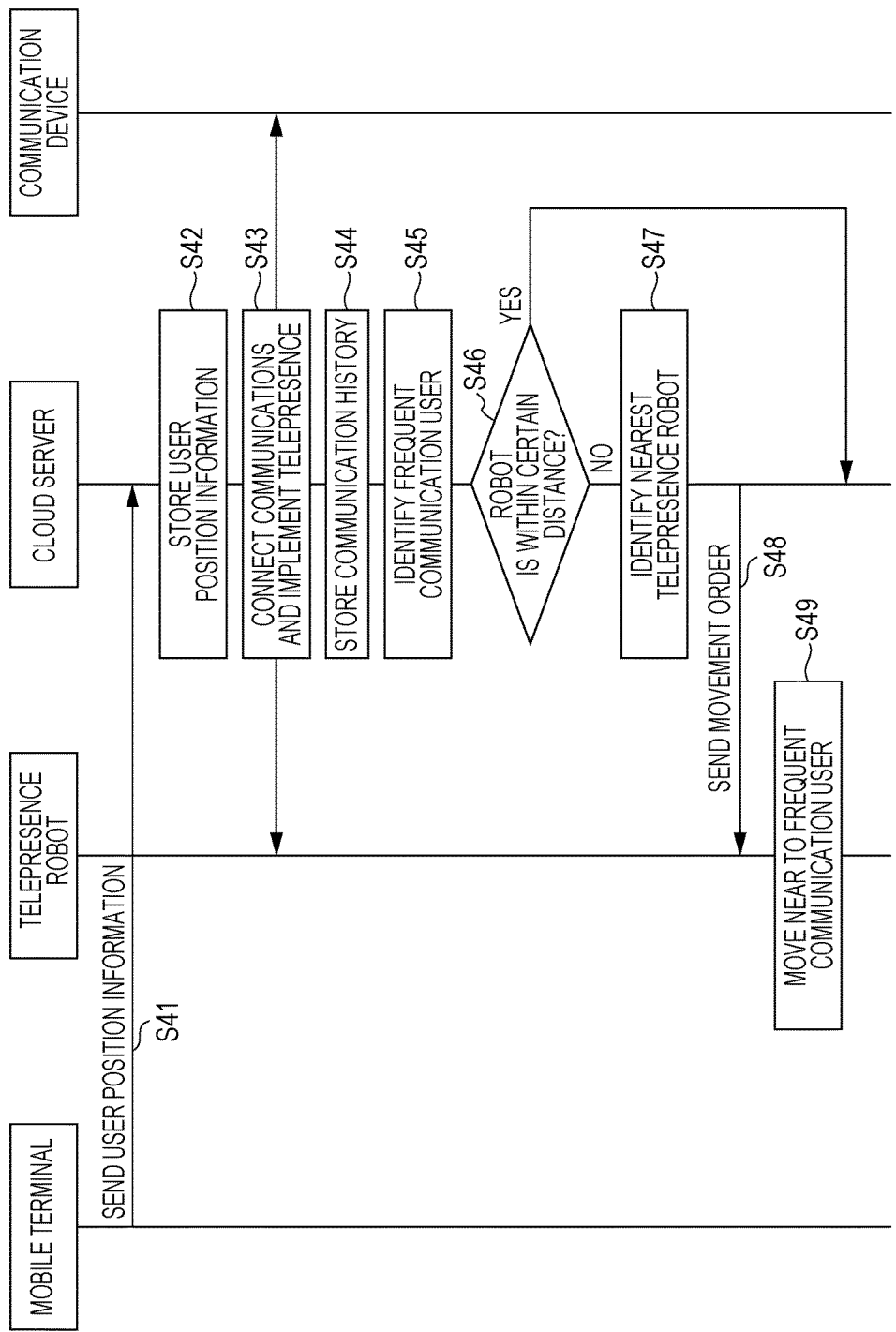
FIG. 11 is a sequence diagram illustrating an example of how the communication system illustrated in FIG. 9 performs a communication control process.

FIG. 11 is a sequence diagram illustrating an example of how the communication system illustrated in FIG. 9 performs the communication control process.

First of all, the position detector 51 of each of the mobile terminals 5a to 5m detects the user position information item on the destination source user at any time or at regular time intervals. The communicator 52 sends the user position information item, and the user identification information item, on the destination source user to the cloud server 3 (step S41).

Thereafter, upon receipt of the user position information item, and the user identification information item, on the destination source user which are sent from each of the mobile terminals 5a to 5m, the communicator 31 of the cloud server 3a outputs the user position information item, and the user identification information item, on the destination source user to the user position manager 61. The user position manager 61 stores the user position information item, and the user identification information item, on the destination source user in the user position DB 62 (step S42).

Subsequently, like the cloud server 3, the cloud server 3a performs the communication control process illustrated in FIG. 3. The interactive connection processor 37 communicably connects the telepresence robot 1 of the communication destination and the communication device 4, as well as implements the telepresence between the communication source user and the communication destination user using the communication device 4 and the telepresence robot 1 which is the nearest to the communication destination user by: sending a message and the like of the communication source user from the communication device 4 to the telepresence robot 1; and sending a message and the like of the communication destination user from the telepresence robot 1 to the communication device 4 (step S43).

After that, the interactive connection processor 37 outputs to the communication history analyzer 63 the communication history information item between the telepresence robot 1 and the communication device 4, which includes: the user identification information items on the communication destination users who communicate using the telepresence robot 1; the time information items on the times when the communication destination users start to use the telepresence robot 1; and the user identification information items on the communication source users who communicate using the communication device 4. The communication history analyzer 63 stores the communication history information item in the communication history DB 64 (step S44).

Next, the communication history analyzer 63 refers to the communication history information item in the communication history DB 64, identifies the communication destination user with the communication frequency higher than the predetermined value as the frequently-accessed person, and outputs the user identification information item on the identified communication destination user to the robot position controller 65 (step S45).

Then, using the neighborhood information manager 34 and the neighborhood information DB 35, the robot position controller 65 determines whether there exists a telepresence robot within the certain distance from the identified communication destination user (step S46). In a case where a telepresence robot exists within the certain distance from the identified communication destination user (YES in step S46), the process is terminated.

On the other hand, in a case where no telepresence robot exists within the certain distance from the identified communication destination user (NO in step S46), the robot position controller 65 identifies a telepresence robot which is the nearest to the identified communication destination user, using the neighborhood information manager 34 and the neighborhood information DB 35 (step S47).

Next, using the communicator 31, the robot position controller 65 sends the identified telepresence robot the movement order to move the telepresence robot to around the identified communication destination user (step S48).

Then, upon receipt of the movement order from the communicator 31, the telepresence robot moves to around the identified communication destination use, and thereafter follows the identified communication destination user while keeping the distance (step S49). Incidentally, for an easy illustration, FIG. 11 illustrates each process as being performed once. However, how to perform each process is not specifically limited to this example. Each process may be performed multiple times depending on the necessity such that based on the latest communication history, a telepresence robot is deployed around a frequently communication person.

In this embodiment, because of the above-discussed process, in the environment where not only the users but also the telepresence robots 1a to 1n move, the communication history DB 64 stores the communication history information items between the communication device 4 used by the communication source user and the telepresence robots 1a to 1n. In each communication history information item, the user identification information items for identifying the communication destination users who communicate using the telepresence robot, and the time information items on the times when the communication destination users use the telepresence robot are associated with each other. A communication destination user with a communication frequency higher than the predetermined value is identified by referring the communication history information items in the communication history DB 64. At least one of the telepresence robots 1a to 1n is deployed around the identified communication destination user. For this reason, using the nearby-existing telepresence robot, the frequently-accessed communication destination user can easily implement the telepresence with the communication device 4 of the communication source user.

Embodiment 3

Figure 12:
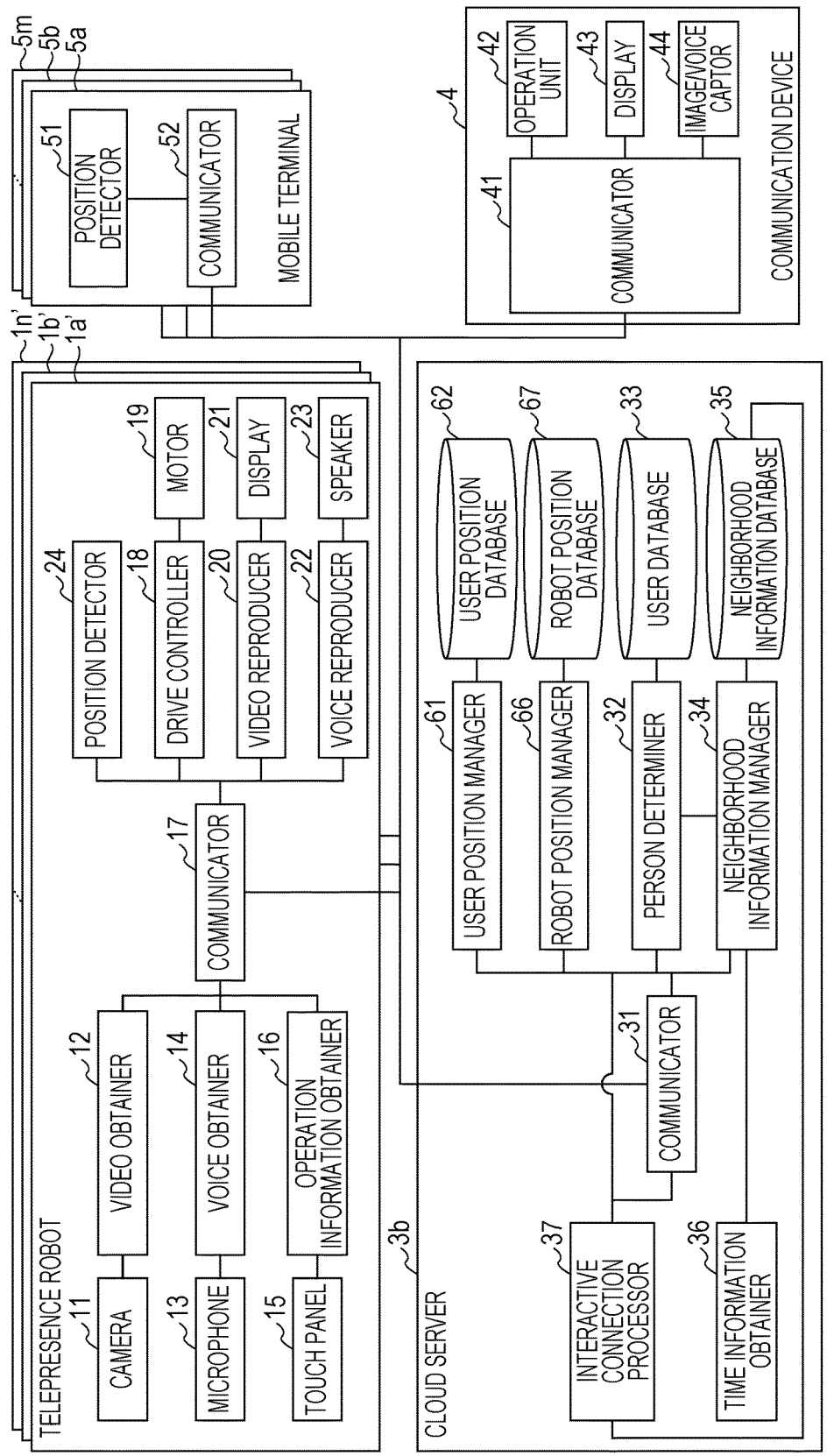
FIG. 12 is a block diagram illustrating an example of a configuration of a communication system according to Embodiment 3 of the present disclosure.

FIG. 12 is a block diagram illustrating an example of a configuration of a communication system according to Embodiment 3 of the present disclosure. What makes the communication system illustrated in FIG. 12 different from the communication system illustrated in FIG. 1 is that: mobile terminals 5a to 5m owned by the communication destination users are added to the communication system; the cloud server 3 is replaced with a cloud server 3b which further includes a user position manager 61, a user position DB 62, a robot position manager 66, a robot position database (DB) 67; and the telepresence robots 1a to 1n are replaced with telepresence robots 1a' to 1n' (hereinafter referred to as telepresence robot 1') each which further includes a position detector 24. The other components of the communication system illustrated in FIG. 12 are the same as the components of the communication system illustrated in FIG. 1. For this reason, the same components will be denoted by the same reference signs, and detailed descriptions for them will be omitted.

In the above-discussed Embodiment 1, the communication device 4 used by the communication source user is communicably connected to the telepresence robot which is the nearest to the communication destination user among the telepresence robots 1a to 1n. In addition to by performing the above-discussed process, however, Embodiment 2 makes the telepresence service easy to use for a communication destination user by: monitoring the positions of all the telepresence robots 1a' to 1n' and the positions of all the communication destination users; automatically adjusting the positions of all the telepresence robots 1a' to 1n' depending on the positions of all the communication destination users; thereby preventing the telepresence robots 1a' to 1n' from gathering around one place.

It should be noted that the cloud server 3b is not specifically limited to the above example. For example, the cloud server 3b may be configured such that: the person determiner 32, the user DB 33, the neighborhood information manager 34, the neighborhood information DB 35, the time information obtainer 36 are removed from the cloud server 3b; the positions of all the telepresence robots 1a' to 1n' and the positions of all the communication destination users are monitored; and the positions of all the telepresence robots 1a' to 1n' are automatically adjusted depending on the positions of all the communication destination users.

Each of the mobile terminals 5a to 5m includes the position detector 51 and the communicator 52, as well has the same configuration, and operates in the same way, as its counterpart of the Embodiment 2.

The communicator 31 of the cloud server 3b receives the user position information items on the current positions of the communication destination users and the user identification information items on the communication destination users which are respectively sent from the mobile terminals 5a to 5m. The communicator 31 outputs the user position information items and the user identification information items to the user position manager 61. The user position manager 61 stores the user position information items and the user identification information items in the user position DB 62.

The position detectors 24 of the telepresence robots 1a' to 1n' have the same configuration as the position detectors 51 of the mobile terminals 5a to 5m, and detects the robot position information items (device position information items) on the current positions of the telepresence robots 1a' to 1n'. The communicators 17 of the telepresence robots 1a' to 1n' send the cloud server 3b the detected robot position information items together with the robot identification information items.

For example, Wi-Fi (Registered Trademark) base stations or beacon transmitters are installed in the Osaka office, and the position detectors 24 estimate the current positions of the telepresence robots 1a' to 1n' by calculating the difference in the intensities of the radio waves from the Wi-Fi (Registered Trademark) base stations or the beacon transmitters using the Wi-Fi (Registered Trademark) positioning method or the beacon positioning method. Incidentally, the method of detecting the current positions of the telepresence robots 1a' to 1n' is not specifically limited to the above example. Other methods may be used to detect the current positions of the telepresence robots 1a' to 1n'. Examples of the other methods include: the autonomous navigation method by which the directions and amounts of movements of the telepresence robots 1a' to 1n' are estimated using the acceleration, magnetism, angular velocity, etc. sensors; the IMES positioning method in which a transmitter using the same method (protocol and frequency) as does the GPS is installed indoor, as well as the indoor and outdoor positions of the telepresence robots 1a' to 1n' are seamlessly measured using the conventional GPS reception function of the smartphone the telepresence robots 1a' to 1n'; and the acoustic positioning method by which the positions of the telepresence robots 1a' to 1n' are estimated by receiving an ultrasonic wave generated from a speaker installed indoor by use of the smartphone.

The communicator 31 of the cloud server 3b receives the robot position information items on the current positions of the telepresence robots 1a' to 1n' and the robot identification information items on the telepresence robots 1a' to 1n' which are sent from the telepresence robots 1a' to 1n'. The communicator 31 outputs the robot position information items and the robot identification information items to the robot position manager 66. The robot position manager 66 stores the robot position information items and the robot identification information items in the robot position DB 67.

The robot position manager 66 reads the user position information items from the user position DB 62 via the user position manager 61, and reads the robot position information items from the robot position DB 67. Based on the user position information items and the robot position information items, the robot position manager 66 determines deployment for dispersing the telepresence robots 1a' to 1n' evenly among the communication destination users. Using the communicator 31, the robot position manager 66 sends the telepresence robots 1a' to 1n' a movement order to move the telepresence robots 1a' to 1n' such that the telepresence robots 1a' to 1n' are deployed dispersedly around the communication destination users.

To put it specifically, the robot position manager 66 calculates the deployment for minimizing the sum of the distances between the communication destination users and the telepresence robots which are the nearest to the communication destination users. Thereby, the robot position manager 66 optimizes the distances between the communication destination users and the telepresence robots 1a' to 1n'.

In addition, in a case where a space where a communication destination user is present ranges over several rooms, or in a case where despite its large size, the space is obstructed with an obstacle exiting therein, the robot position manager 66 may be configured to perform route planning using one of the below-given methods, where for each telepresence robot, its movement route starts at its current position and ends at the current position of a corresponding communication destination user, and thereby to move the telepresence robots to places which minimize the sum of the distances of the movement routes of the telepresence robots. For example, usable is a method discussed in Uchida, M. [1995 (Heisei-7)]. "The Shortest Path Plan Method for Mobile Robot," *Transactions of the Institute of Electrical Engineers of Japan. C*, vol. 115, no. 9, pp. 1079-1085, or a method discussed in Chen, Q., and Tsuji, S. [1992]. "An Easily Updated Map Model for Indoor Robot," *Journal of the Robotics Society of Japan*, Vol. 10, no. 1, pp. 89-98. Incidentally, a map and the like of the floor in a space where a communication destination user is present is store in the robot position DB 67 in advance.

Figure 13:
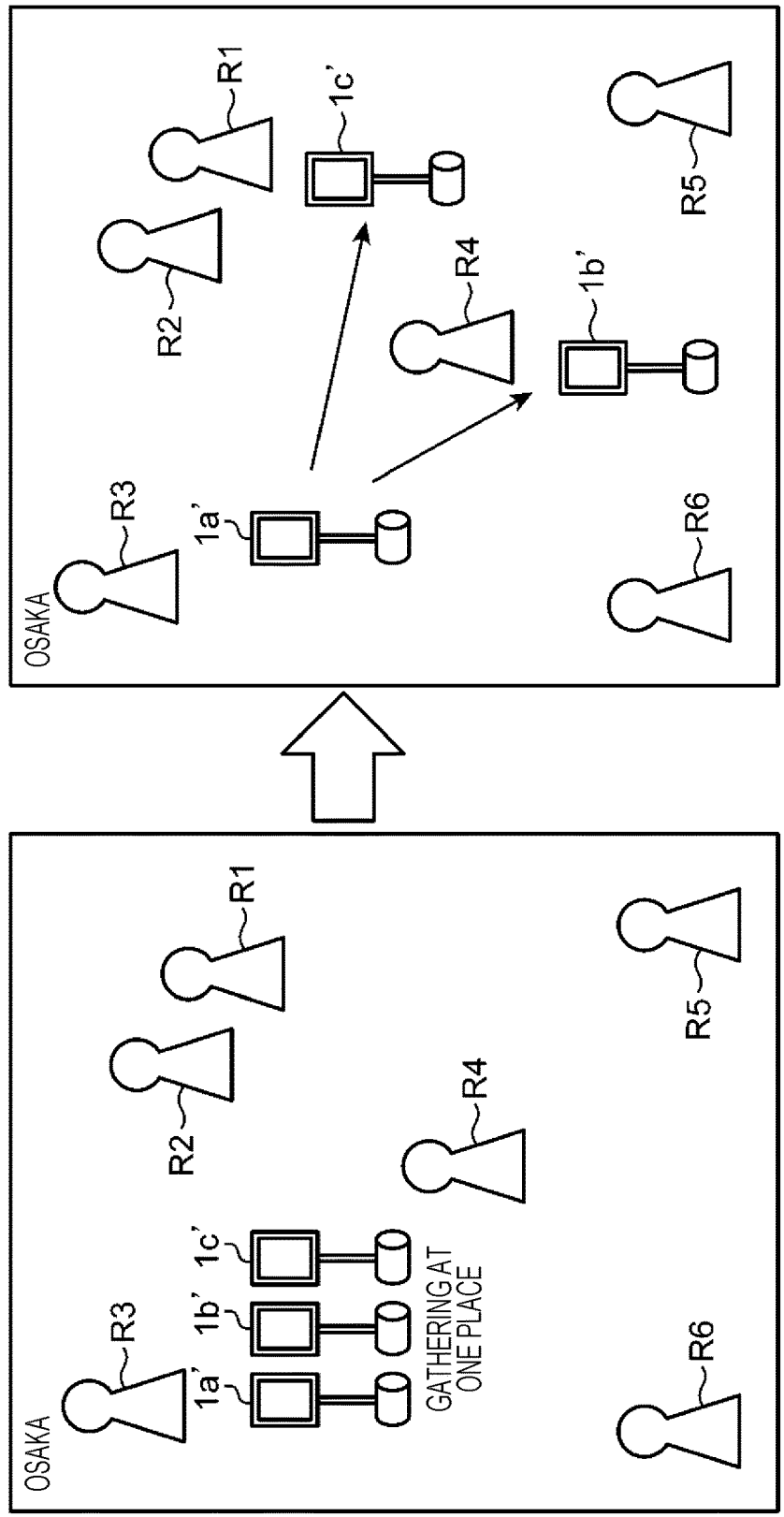
FIG. 13 is a schematic diagram illustrating an example of how telepresence robots illustrated in FIG. 12 are deployed.

FIG. 13 is a schematic diagram illustrating an example of how the telepresence robots 1a' to 1n' illustrated in FIG. 12 are deployed. Let us assume a case where, for example, six users R1 to R6 and three telepresence robots 1a' to 1c' are in the Osaka office which is the communication destination. In this case, before the above-discussed movement order is sent, as illustrated in the left half of FIG. 13, the six users R1 to R6 disperse while the three telepresence robots 1a' to 1c' gather around one place. At this moment, the cloud server 3 sends the movement order to two telepresence robots 1b', 1c'. Thus, as illustrated in the right half of FIG. 13, the two telepresence robots 1b', 1c' move, and the three telepresence robots 1a' to 1c' are accordingly deployed in their respective places which are dispersed among the six users R1 to R6.

Figure 14:
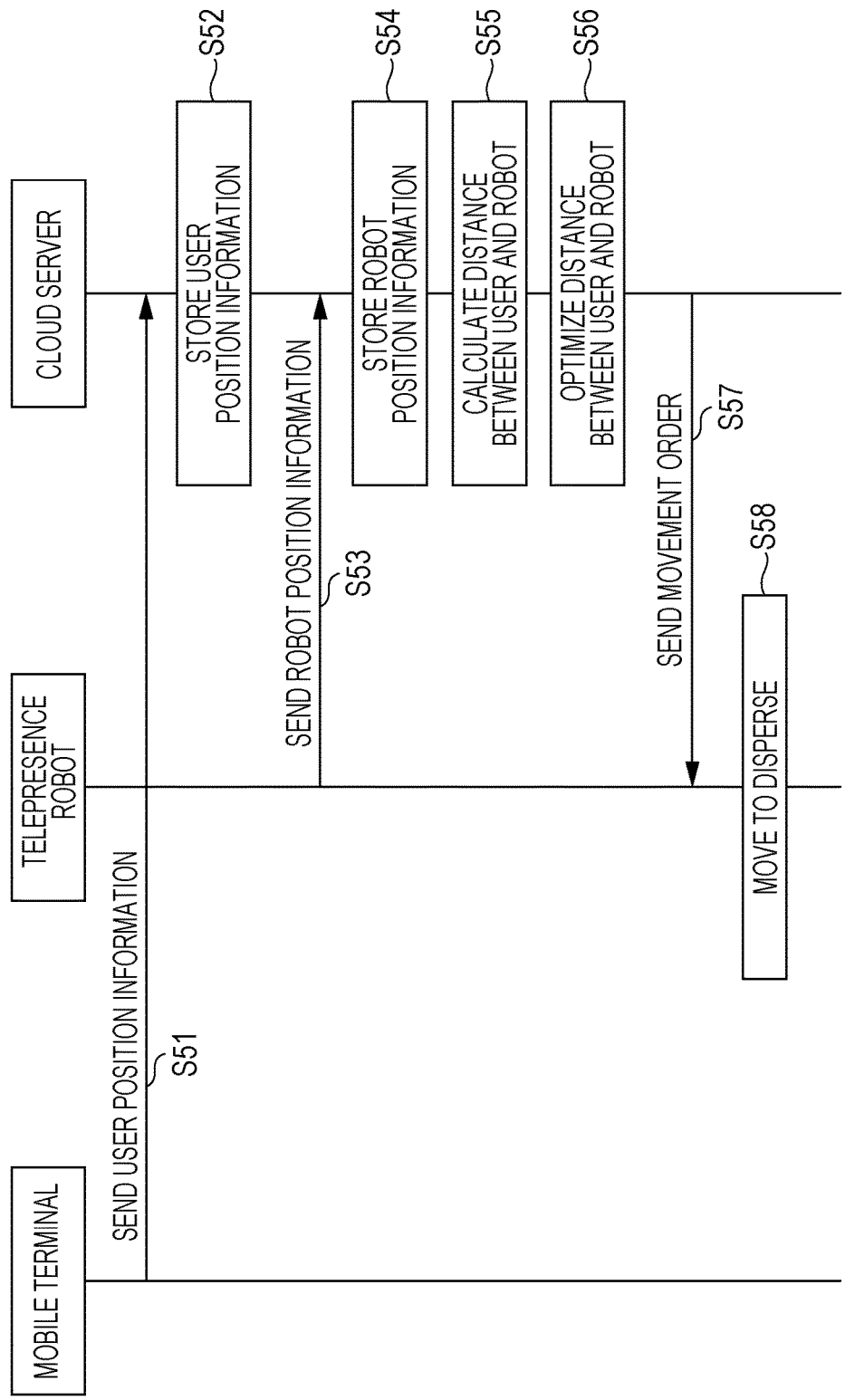
FIG. 14 is a sequence diagram illustrating an example of how the communication system illustrated in FIG. 12 performs a communication control process.

FIG. 14 is a sequence diagram illustrating an example of how the communication system illustrated in FIG. 12 performs a communication control process.

First of all, the position detectors 51 of the mobile terminals 5a to 5m detect the user position information items on the communication destination users at any time or at regular time intervals. The communicators 52 thereof send the cloud server 3b the user position information items and the user identification information items on the communication destination users (step S51).

Thereafter, the communicator 31 of the cloud server 3b receives the user position information items and the user identification information items on the communication destination users which are sent from the mobile terminals 5a to 5m. The communicator 31 outputs the user position information items and the user identification information items on the communication destination users to the user position manager 61. The user position manager 61 stores the user position information items and the user identification information items on the communication destination users in the user position DB 62 (step S52).

Next, the position detectors 24 of the telepresence robots 1a' to 1n' detect the robot position information items on the telepresence robots 1a' to 1n' at any time or at regular time intervals. The communicators 17 thereof send the cloud server 3b the robot position information items and the robot identification information items on the telepresence robots 1a' to 1n' (step S53).

Thereafter, the communicator 31 of the cloud server 3b receives the robot position information items and the robot identification information items which are sent from the telepresence robots 1a' to 1n'. The communicator 31 outputs the robot position information items and the robot identification information items on the telepresence robots 1a' to 1n' to the robot position manager 66. The robot position manager 66 stores the robot position information items and the robot identification information items on the telepresence robots 1a' to 1n' in the robot position DB 67 (step S54).

Subsequently, the robot position manager 66 reads the user position information items from the user position DB 62 via the user position manager 61, and reads the robot position information items from the robot position DB 67. The robot position manager 66 calculates the current distances between the communication destination users and the telepresence robots which are the nearest to the communication destination users (step S55).

Then, the robot position manager 66 calculates the deployment for minimizing the sum of the distances between the communication destination users and the telepresence robots which are the nearest to the communication destination users. Thereby, the robot position manager 66 optimizes the distances between the communication destination users and the telepresence robots (step S56).

Next, using the communicator 31, the robot position manager 66 sends the telepresence robots 1a' to 1n' the movement order to move the telepresence robots 1a' to 1n' to be deployed in a way that minimizes the sum of the distances between the communication destination users and the telepresence robots which are the nearest to the communication destination users (step S57).

Thereafter, upon receipt of the movement order from the communicator 31, the telepresence robots 1a' to 1n' move to their respective places specified by the movement order (step S58). Thus, the telepresence robots 1a' to 1n' are deployed dispersedly around the communication destination users. Incidentally, for an easy illustration, FIG. 14 illustrates each process as being performed once. However, how to perform each process is not specifically limited to this example. Each process may be performed multiple times depending on the necessity such that the telepresence robots 1a' to 1n' always disperse around the latest positions of the communication destination users.

In this embodiment, because of the above-discussed process, in the environment where not only the users but also the telepresence robots 1a' to 1n' move, the user position information items on the positions of the communication destination users, and the robot position information items on the positions of the telepresence robots 1a' to 1n' are received; and, based on the received user position information items and the robot position information items, the telepresence robots 1a' to 1n' are moved such that the telepresence robots 1a' to 1n' are deployed dispersedly around the communication destination users. Accordingly, each of the communication destination users can communicate with the communication device 4 of the communication source user using a telepresence robot which is the nearest to the communication destination user. This makes it possible to use the telepresence robots 1a' to 1n' efficiently.

Embodiment 4

Figure 15:
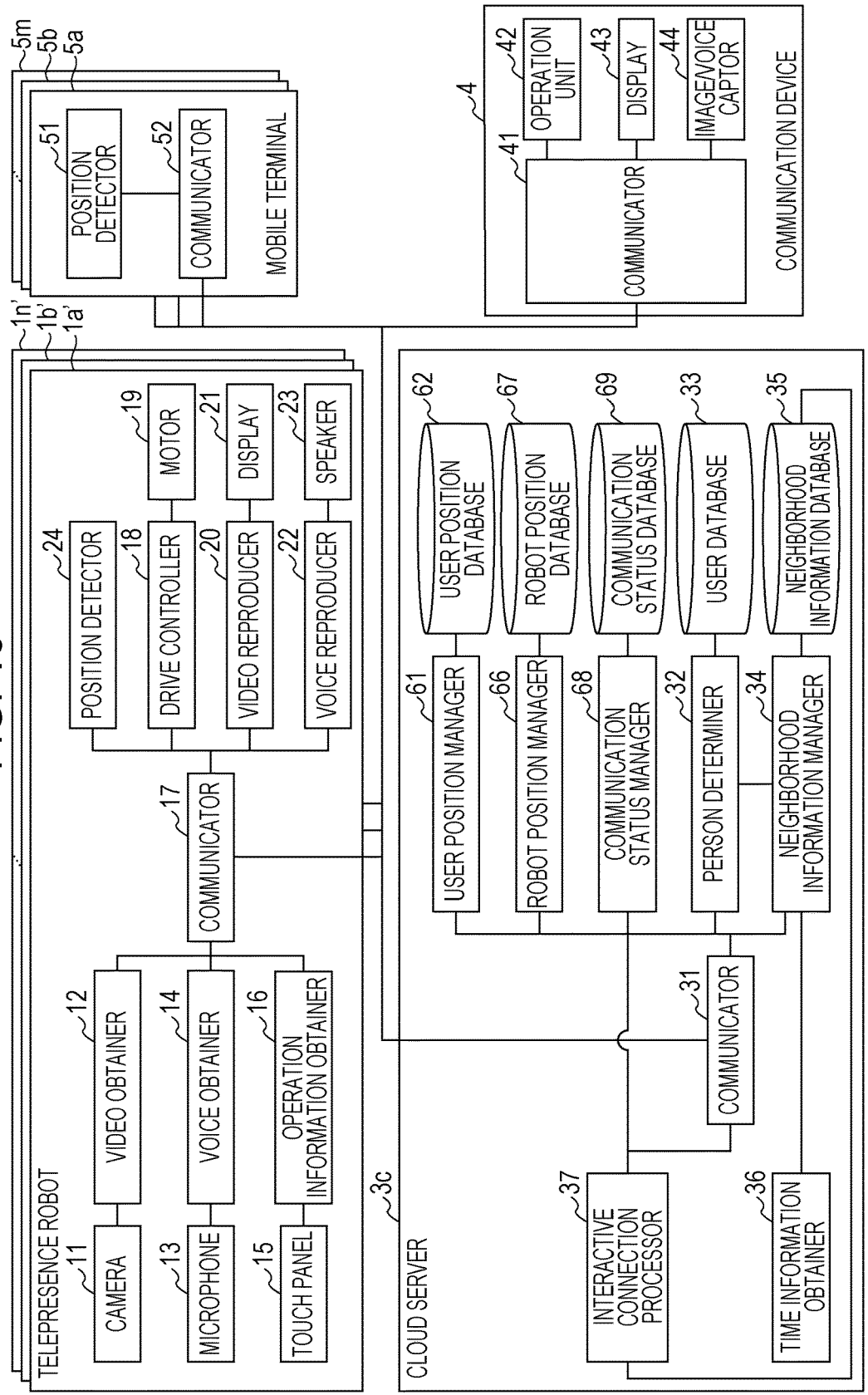
FIG. 15 is a block diagram illustrating an example of a configuration of a communication system according to Embodiment 4 of the present disclosure.

FIG. 15 is a block diagram illustrating an example of a configuration of a communication system according to Embodiment 4 of the present disclosure. What makes the communication system illustrated in FIG. 15 different from the communication system illustrated in FIG. 12 is that: the cloud server 3*b* is replaced with the cloud server 3*c* which further includes a communication status manager 68, and a communication status database (DB) 69. The other components of the communication system illustrated in FIG. 15 are the same as the components of the communication system illustrated in FIG. 12. For this reason, the same components will be denoted by the same reference signs, and detailed descriptions for them will be omitted.

In the above-discussed Embodiment 3, the positions of all the telepresence robots 1*a*' to 1*n*', and the positions of all the communication destination users are monitored; and the positions of all the telepresence robots 1*a*' to 1*n*' are automatically adjusted depending on the positions of all the communication destination users. In this embodiment, the positions of all the telepresence robots 1*a*' to 1*n*', and the positions of all the communication destination users are monitored; a telepresence robot engaging in communication (hereinafter referred to as an in-communication telepresence robot) is identified; the positions of the telepresence robots engaging in no communication (hereinafter referred to as out-of-communication telepresence robots) (out-of-communication communication devices), exclusive of the position of the in-communication telepresence robot, are automatically adjusted depending on the positions of the communication destination users engaging in no communication (hereinafter referred as out-of-communication users), exclusive of the position of the user who is using the in-communication telepresence robot; and the out-of-communication telepresence robots are presented from gathering around one place. Thereby, any of the out-of-communication users can easily implement the implementation.

It should be noted that the cloud server 3*c* is not specifically limited to the above example. For example, the cloud server 3*c* may be configured such that: the person determiner 32, the user DB 33, the neighborhood information manager 34, the neighborhood information DB 35, the time information obtainer 36 are removed from the cloud server 3*c*; the positions of all the telepresence robots 1*a*' to 1*n*' and the positions of all the communication destination users are monitored; an in-communication telepresence robot is identified; and the positions of the out-of-communication telepresence robots, exclusive of the position of the in-communication telepresence robot, are automatically adjusted depending on the positions of the out-of-communication communication destination users, exclusive of the position of the user who is using the in-communication telepresence robot.

When communicably connecting a telepresence robot 1 and the communication device 4, the interactive connection processor 37 outputs to the communication status manager 68 a communication status information item on a communication status between the telepresence robot 1 and the communication device 4 which includes: the robot identification information item on the telepresence robot 1 in use for the communication; and the user identification information item on the communication destination user engaging in communication using the telepresence robot 1. The communication status manager 68 stores the current communication status information item in the communication status DB 69, and updates the communication status.

The communication status manager 68 refers to the communication status information item in the communication status DB 69, identifies the in-communication telepresence robot from all the telepresence robots 1*a*' to 1*n*', and outputs to the robot position manager 66 the robot identification information item on the in-communication telepresence robot and the user identification information item on the communication destination user using the telepresence robot.

Excluding the robot position information item on the in-communication telepresence robot and the user position information item on the communication destination user using the telepresence robot, the robot position manager 66 reads the user position information items from the user position DB 62 via the user position manager 61, and reads the robot position information items from the robot position DB 67. The robot position manager 66 determines deployment for dispersing the out-of-communication telepresence robots evenly among the out-of-communication users, based on the user position information items and the robot position information items, exclusive of the user position information item on the communication destination user using the in-communication telepresence robot and the robot position information item on the telepresence robot. Using the communicator 31, the robot position manager 66 sends the out-of-communication telepresence robots a movement order to move the out-of-communication telepresence robots such that the out-of-communication telepresence robots are deployed dispersedly around the out-of-communication users.

Figure 16:
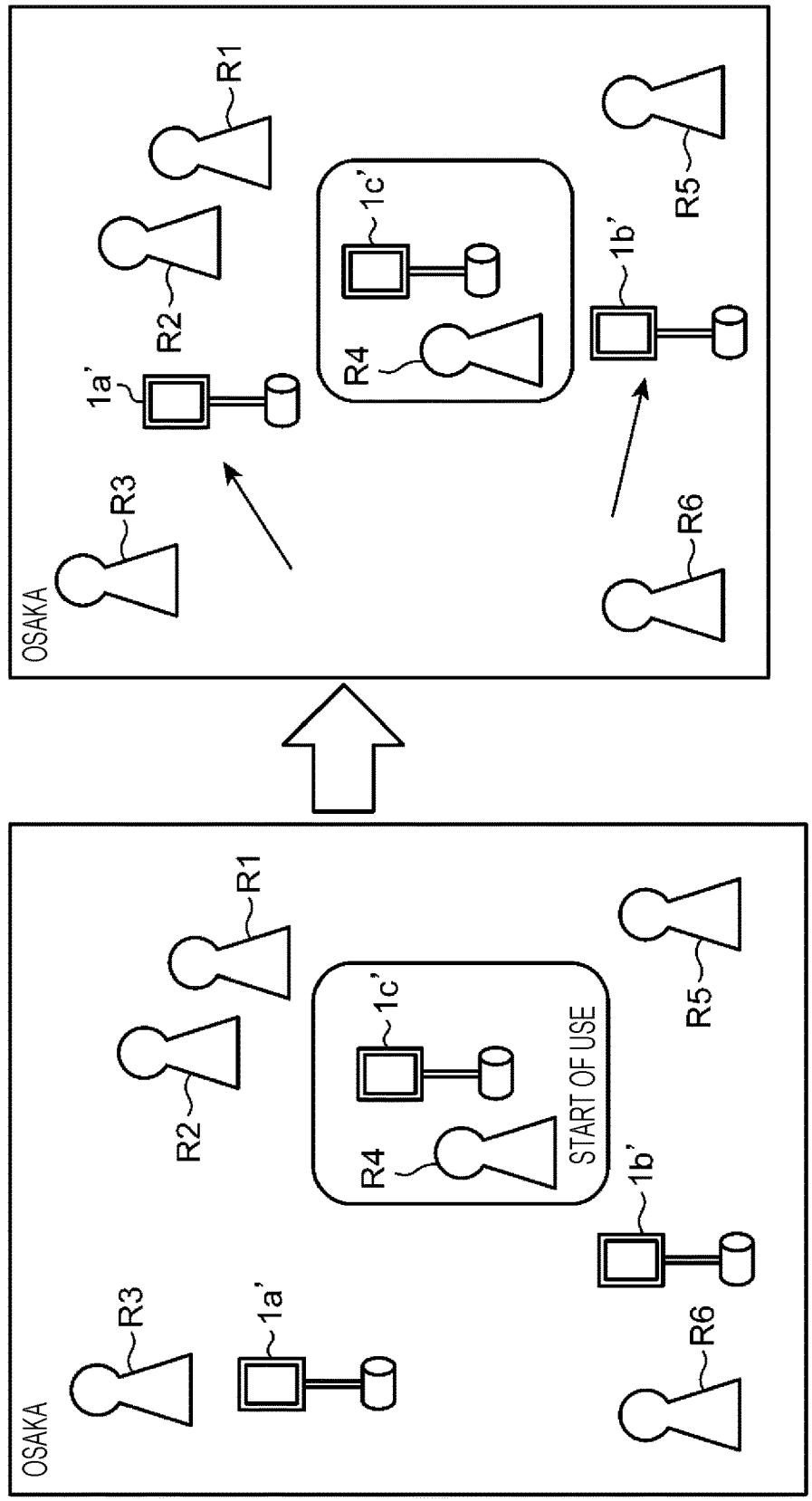
FIG. 16 is a schematic diagram illustrating an example of how telepresence robots illustrated in FIG. 15 are deployed.

FIG. 16 is a schematic diagram illustrating an example of how the telepresence robots 1*a*' to 1*n*' illustrated in FIG. 15 are deployed. Let us assume a case where, for example, six users R1 to R6 and three telepresence robots 1*a*' to 1*c*' are in the Osaka office which is the communication destination. In this case, before the above-discussed movement order is sent, as illustrated in the left half of FIG. 16, the six users R1 to R6 disperse, and the three telepresence robots 1*a*' to 1*c*' are deployed dispersedly around the six users R1 to R6. At this moment, the user R4 starts to implement the telepresence using the telepresence robot 1*c*'. Excluding the user R4 and the telepresence robot 1*c*', the cloud server 3*c* sends the two telepresence robots 1*a*', 1*b*' the movement order so as to deploy the two telepresence robots 1*a*', 1*b*' dispersedly around the five users R1 to R3, R4, R6. Thus, as illustrated in the right half of FIG. 16, the two telepresence robots 1*a*', 1*b*' move, and are accordingly deployed in their respective places which are dispersed around the five users R1 to R3, R4, R6.

FIG. 17 is a sequence diagram illustrating an example of how the communication system illustrated in FIG. 15 performs a communication control process.

First of all, in the communication control process illustrated in FIG. 17, processes in steps S51 to S54 are performed like in the communication control process illustrated in FIG. 14.

Next, like the cloud server 3, the cloud server 3*c* performs the communication control process illustrated in FIG. 3. The interactive connection processor 37 communicably connects the telepresence robot 1 of the communication destination and the communication device 4, as well as implements the telepresence between the communication source user and the communication destination user using the communication device 4 and the telepresence robot 1 which is the nearest to the communication destination user by: sending a message and the like of the communication source user from the communication device 4 to the telepresence robot 1; and sending a message and the like of the communication destination user from the telepresence robot 1 to the communication device 4 (step S61).

Thereafter, the interactive connection processor 37 outputs to the communication status manager 68 the communication status information item on a communication status between the telepresence robot 1 and the communication device 4 which includes: the robot identification information item on the telepresence robot 1 in use for the communication; and the user identification information item on the communication destination user engaging in communication using the telepresence robot 1. The communication status manager 68 stores the current communication status information item in the communication status DB 69, and updates the communication status (step S62).

Subsequently, the communication status manager 68 refers to the communication status information item in the communication status DB 69, identifies the in-communication telepresence robot, and outputs to the robot position manager 66 the robot identification information item on the in-communication telepresence robot and the user identification information item on the communication destination user using the telepresence robot. Excluding the robot position information item on the in-communication telepresence robot and the user position information items on the communication destination user using the in-communication telepresence robot, the robot position manager 66 reads the user position information items and the robot position information items. The robot position manager 66 calculates the current distances between the out-of-communication communication destination users and the unused telepresence robots which are the nearest to the communication destination users (step S63).

Then, the robot position manager 66 calculates the deployment for minimizing the sum of the distances between the out-of-communication communication destination users and the unused telepresence robots which are the nearest to the communication destination users. Thereby, the robot position manager 66 optimizes the distances between the out-of-communication users and the unused telepresence robots (step S64).

After that, using the communicator 31, the robot position manager 66 sends the out-of-communication telepresence robots a movement command to move the out-of-communication telepresence robots such that the out-of-communication telepresence robots are deployed dispersedly around the out-of-communication users (step S65).

Next, after receiving the movement order from the communicator 31, the out-of-communication telepresence robots move to their respective places specified by the movement order (step S66). Accordingly, the out-of-communication telepresence robots are deployed dispersedly around the out-of-communication communication destination users. Incidentally, for an easy illustration, FIG. 17 illustrates each process as being performed once. However, how to perform each process is not specifically limited to this example. Each process may be performed multiple times depending on the necessity such that the out-of-communication telepresence robots always disperse around the latest positions of the out-of-communication communication destination users.

In this embodiment, because of the above-discussed process, in the environment where not only the users but also the telepresence robots 1$a'$ to 1$n'$ move, the out-of-communication telepresence robot not engaging in communication with the communication device 4, which are among the telepresence robots 1$a'$ to 1$n'$, are moved such that the out-of-communication telepresence robots are deployed dispersedly around the out-of-communication users not engaging in communication with the communication device 4, who are among the communication destination users. Thus, any out-of-communication user can easily communicate with the communication device 4 using an out-of-communication telepresence robot which is the nearest to the out-of-communication user. This makes it possible to use the out-of-communication telepresence robots efficiently.

Although the communication systems according to one aspect and others of the present disclosure have been discussed based on the foregoing embodiments, the present disclosure is not to the foregoing embodiments. Various modifications to the embodiments at which those skilled in the art arrive, or embodiments obtained by combining components in one embodiment with those in another embodiment are also included in the scope of the present disclosure as long as they do not depart from the gist or spirit of the present disclosure.

In the environment where the communication destination users move, the communication control methods, communication controllers, telepresence robots, communication control programs according to the present disclosure are capable of communicably connecting the communication source device used by the communication source user to a communication destination device which is the most appropriate for a specific communication destination user among the communication destination devices, and therefore are useful for the telepresence and the like to offer a sense of presence as if the communication source user and the communication destination user in the remote location met each other at one place.

What is claimed is:

1. A method for controlling communications between a first communication device and second communication devices, the method comprising:
   (A) receiving, from the second communication devices, device identification information items for identifying the second communication devices, and situation information items for grasping situations around the second communication devices;
   (B) when at least one of the received situation information items includes an information item on a user, updating a neighborhood information database indicating which second communication device is around the user, based on the information item on the user and the at least one of the device identification information items;
   (C) when receiving a request for connection to the user from the first communication device, selecting, from among the second communication devices, a second communication device present around the user with reference to the neighborhood information database; and
   (D) communicably connecting the selected second communication device and the first communication device.

2. The method according to claim 1, wherein the (B) includes
   (b1) when the at least one of the received situation information items includes a feature information item on a feature of a person, determining the user corresponding to the person from among users by comparing the feature of the person with features of the users registered in a user database, and
   (b2) generating at least one neighborhood information item in which the determined user is associated with at least one of the second communication devices being present around the user.

3. The method according to claim 2, wherein the (B) further includes
   (b3) in a case where two or more neighborhood information items related to the same user are generated within a latest predetermined period, determining, from the two or more neighborhood information items, a neighborhood information item related to the second communication device nearest to the user among the second communication devices, and (b4) storing the determined neighborhood information item to the neighborhood information database.

4. The method according to claim 2, wherein the (b2) includes (b21) acquiring, from the user database, a user identification information item for identifying the determined user, and (b22) associating the acquired user identification information item with the at least one device identification information item for identifying the at least one second communication device being present around the user.

5. The method according to claim 1, wherein the connection request includes a target user identification information item for identifying the user as a target user, and the (C) includes (c1) determining, from user identification information items in the neighborhood information database, a user identification information item matching the target user identification information item, and (c2) identifying, from the neighborhood information database, the device identification information item associated with the determined user identification information item.

6. The method according to claim 2, wherein the situation information items are image data items obtained by capturing images of neighborhoods of the second communication devices,
the feature of the person is a feature of a face of the person included in the image data items, and
the features of the users are features of faces of the users.

7. The method according to claim 3, wherein the situation information items are image data items obtained by capturing images of neighborhoods of the second communication devices,
the feature of the person is a feature of a face of the person included in the image data items, and
the features of the users are features of faces of the users, and
the (b3) includes (b31) extracting, from two or more image data items including the face of the same user, two or more face image areas on which the face of the user are captured, (b32) comparing the two or more face image areas, and determining the image data item including the largest face image area among the two or more image data items, and (b33) regarding a second communication device obtaining the determined image data item as the second communication device which is the nearest to the user.

8. The method according to claim 2, wherein the situation information items are voice data items obtained by recording voices in neighborhoods of the second communication devices,
the feature of the person is a feature of a voice of the person included in the voice data items, and
the features of the users are features of voices of the users.

9. The method according to claim 3, wherein the situation information items are voice data items obtained by recording voices in neighborhoods of the second communication devices,
the feature of the person is a feature of a voice of the person included in the voice data items, and
the features of the users are features of voices of the users, and
the (b3) includes (b31) analyzing two or more voice data items including the voice of the same user, and obtaining two or more position information items on relative position relationships between a voice source of the voice of the user and two or more second communication devices obtaining the two or more voice data items, and (b32) determining the second communication device nearest to the user by referring to the two or more position information items.

10. The method according to claim 1, wherein the information item on the user is a signal information item on a beacon signal transmitted from the user, and the (B) includes (b1) when the at least one of the received situation information items includes the signal information item, determining the user from among users by comparing the signal information item with signal information items on users registered in a user database, and (b2) generating at least one neighborhood information item in which the determined user is associated with at least one of the second communication devices being present around the user.

11. The method according to claim 10, wherein the (B) further includes (b3) in a case where two or more neighborhood information items related to the same user are generated within a latest predetermined period, obtaining, from two or more signal information items on the beacon signal transmitted from the same user, respectively, intensity information items on intensities of the beacon signal, (b4) determining the second communication device nearest to the user among the two or more second communication devices by referring to the two or more intensity information items, and (b5) storing a neighborhood information item related to the determined second communication device to the neighborhood information database.

12. The method according to claim 1, further comprising:

(E) storing, to a communication history database, a communication history information item in which a user identification information item for identifying the user as a target user is associated with a communication time information item indicating a time when the selected second communication device and the first communication device communicate with each other, and (F) deploying at least one of the second communication devices around the target user in a case where a communication frequency of the target user is higher than a predetermined value by referring to the communication history database.

13. The method according to claim 12, wherein the (F) includes, in a case where the communication frequency of the target user in a time range is higher than the predetermined value, deploying at least one of the second communication devices around the target user for the time range.

14. The method according to claim 1, further comprising:

(G) each time the device identification information item and the situation information item are received, updating device position information items on positions of the second communication devices and user position information items on positions of users, and
(H) based on the device position information items and the user position information items, moving the second communication devices such that the second communication devices are deployed dispersedly around the users.

15. The method according to claim 14, wherein the (H) includes moving at least two of the second communication devices, which are not engaging in communication with the first communication device, such that the at least two second communication devices are deployed dispersedly around at least two of the users who are not engaging in communication with any users.

16. The method according to claim 1, further comprising
(I) after the (B), sending the second communication devices at least partial information of the updated neighborhood information database.

17. The method according to claim 1, wherein each of the second communication devices is a telepresence robot, and
the second communication device includes
a pair of wheels or a pair of legs,
a communicator,
a display,
a speaker, and
a microphone.

18. A controller that controls communications between a first communication device and second communication devices, the controller comprising:
a memory in which a program for performing the method according to claim 1 is recorded; and
a processor which executes the program.

19. A telepresence robot comprising:
the controller according to claim 18;
at least one of the second communication devices;
a pair of wheels or a pair of legs;
a communicator;
a display;
a speaker; and
a microphone.

20. A non-transitory storage medium recording a program which causes a processor to perform the method according to claim 1.

* * * * *